United States Patent
Cirucci et al.

(10) Patent No.: US 12,533,624 B2
(45) Date of Patent: Jan. 27, 2026

(54) SYSTEM AND METHOD FOR RESOURCE-EFFICIENT CARBON DIOXIDE CAPTURE

(71) Applicant: ARIZONA BOARD OF REGENTS ON BEHALF OF ARIZONA STATE UNIVERSITY, Scottsdale, AZ (US)

(72) Inventors: John Cirucci, Scottsdale, AZ (US); Klaus Lackner, Longmont, CO (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 327 days.

(21) Appl. No.: 18/255,077

(22) PCT Filed: Dec. 8, 2021

(86) PCT No.: PCT/US2021/062489
§ 371 (c)(1),
(2) Date: May 30, 2023

(87) PCT Pub. No.: WO2022/125716
PCT Pub. Date: Jun. 16, 2022

(65) Prior Publication Data
US 2024/0024811 A1   Jan. 25, 2024

Related U.S. Application Data

(60) Provisional application No. 63/123,219, filed on Dec. 9, 2020.

(51) Int. Cl.
*B01D 53/04* (2006.01)
*B01D 53/047* (2006.01)
*B01D 53/26* (2006.01)

(52) U.S. Cl.
CPC ..... *B01D 53/0454* (2013.01); *B01D 53/0438* (2013.01); *B01D 53/0446* (2013.01);
(Continued)

(58) Field of Classification Search
CPC ............ B01D 53/0438; B01D 53/0446; B01D 53/0454; B01D 53/0462; B01D 53/047; B01D 53/261
See application file for complete search history.

(56) References Cited

U.S. PATENT DOCUMENTS

| 4,270,937 A | 6/1981 | Adler |
| 4,324,564 A | 4/1982 | Oliker |

(Continued)

FOREIGN PATENT DOCUMENTS

| CA | 2688687 | 11/2008 |
| DE | 882541 | 7/1953 |

(Continued)

OTHER PUBLICATIONS

Wurzbacher et al. Concurrent Separation of CO2 and H2O from Air by Temperature Vacuum Swing Adsorption/Desorption Cycle. Environ. Sci. Technol. 2012, 46, 991-9198. (Year: 2012).*

(Continued)

*Primary Examiner* — Sharon Pregler
(74) *Attorney, Agent, or Firm* — FULLER IP LAW LLC; Rodney J. Fuller

(57) ABSTRACT

A system for collecting a sorbate gas from a sorbent is disclosed, including a regeneration vessel enclosing a sorbent having a sorbate gas, a liquid water supply heated to a first temperature, and a heat pump with a condenser. The heat pump is also in contact with the water supply. Heat is removed from the condenser and used to heat the water supply to the first temperature. The system includes a compressor coupled to the condenser. The sorbent within the (Continued)

vessel is placed in contact with water vapor at the first temperature. The water vapor coming into contact with the sorbent causes sorbate gas to be released, forming a mixture including sorbate and water gases, raising the pressure. The vapor mixture is removed and cooled by the condenser, where a portion is condensed into water that is returned to the supply. The remaining mixture is compressed into a product gas.

20 Claims, 6 Drawing Sheets

(52) U.S. Cl.
CPC ....... *B01D 53/0462* (2013.01); *B01D 53/047* (2013.01); *B01D 53/261* (2013.01); *B01D 2253/102* (2013.01); *B01D 2253/108* (2013.01); *B01D 2253/206* (2013.01); *B01D 2257/504* (2013.01); *B01D 2258/06* (2013.01); *B01D 2259/40088* (2013.01); *B01D 2259/40092* (2013.01)

(56) References Cited

U.S. PATENT DOCUMENTS

| | | | |
|---|---|---|---|
| 5,755,857 | A | 5/1998 | Acharya |
| 5,759,236 | A | 6/1998 | Thomas |
| 9,283,510 | B2 | 3/2016 | Lackner |
| 11,559,762 | B1 | 1/2023 | Kuo |
| 2009/0173073 | A1 | 7/2009 | Guidati |
| 2009/0232861 | A1 | 9/2009 | Wright |
| 2011/0203311 | A1 | 8/2011 | Wright |
| 2011/0265512 | A1 | 11/2011 | Bearden |
| 2011/0296872 | A1 | 12/2011 | Eisenberger |
| 2012/0312020 | A1 | 12/2012 | Hume |
| 2013/0047664 | A1 | 2/2013 | Dicenzo |
| 2013/0255597 | A1* | 10/2013 | Hall ............... B01D 53/261 95/91 |
| 2014/0331864 | A1 | 11/2014 | Ogino |
| 2016/0207037 | A1 | 7/2016 | Lackner |
| 2017/0203249 | A1 | 7/2017 | Gebald |
| 2019/0022574 | A1 | 1/2019 | Jin |
| 2020/0001225 | A1 | 1/2020 | Ritter |
| 2020/0009494 | A1 | 1/2020 | Ritter |
| 2020/0309451 | A1 | 10/2020 | Abarr |
| 2021/0187434 | A1 | 6/2021 | Gebald |
| 2021/0187438 | A1 | 6/2021 | Nishibe |
| 2024/0017202 | A1 | 1/2024 | Cirucci |
| 2024/0017203 | A1 | 1/2024 | Cirucci |

FOREIGN PATENT DOCUMENTS

| | | |
|---|---|---|
| EP | 1710008 | 10/2006 |
| EP | 2564914 | 3/2013 |
| FR | 3025300 | 3/2016 |
| WO | 2012111495 A1 | 8/2012 |
| WO | 2019238488 | 12/2019 |
| WO | 2021188547 | 9/2021 |
| WO | 2022125717 | 6/2022 |
| WO | 2022125718 | 6/2022 |

OTHER PUBLICATIONS

Department of the Army, U.S. Army Corps of Engineers, Mar. 1, 2001, "Engineering and Design: Adsorption Design Guide," Design Guide No. 1110-1-2.

Jacob, et al., (2015), "Energy Release Pathways in Nanothermites Follow Through the Condensed State," Combustion and Flame, 162, pp. 258-264.

Keith, et al. (2018), "A Process for Capturing CO2 from the Atmosphere," Joule, V2, 1573-1594.

Rezaei, et al. (2010), "Structured Adsorbents in Gas Separation Processes," Separation and Purification Technolgoy, 70, pp. 243-256.

Santori et al. (2018), "Adsorption artificial tree for atmospheric carbon dioxide capture, purification and compression," Energy, Elsevier, Amsterdam, Nl, vol. 162, Aug. 14, 2018, pp. 1158-1168.

Wang, T., Lackner, K. S., & Wright, A. (2011). "Moisture swing sorbent for carbon dioxide capture from ambient air." Environmental science & technology, 45(15), 6670-6675.

Wang, T., Lackner, K. S., & Wright, A. B. (2013). "Moisture-swing sorption for carbon dioxide capture from ambient air: a thermodynamic analysis." Physical Chemistry Chemical Physics, 15(2), 504-514.

Wynnyk Kyle G., Hojjati Behnaz, Marriott Robert A., "Sour Gas and Water Adsorption on Common High-Pressure Desiccant Materials: Zeolite 3A, Zeolite 4A, and Silica Gel", Journal of Chemical and Engineering Data., American Chemical Society., US, US, (Jul. 11, 2019), vol. 64, No. 7, doi:10.1021/acs.jced. 9b00233, ISSN 0021-9568, pp. 3156-3163, XP055950184.

* cited by examiner

SYSTEM AND METHOD FOR RESOURCE-EFFICIENT CARBON DIOXIDE CAPTURE

RELATED APPLICATIONS

This application is the U.S. National Stage of International Patent Application No. PCT/US2021/062489, filed Dec. 8, 2021, which claims the benefit of and priority to U.S. provisional patent application no. 63/123,219, filed Dec. 9, 2020, titled "System and Method for Energy-Efficient Carbon Dioxide Capture," the contents of each of which are hereby incorporated by reference in their entireties.

TECHNICAL FIELD

Aspects of this document relate generally to carbon dioxide capture

BACKGROUND

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric carbon dioxide collectors can quickly overrun a tight energy budget for drawing in and processing air in bulk.

Capturing carbon dioxide from the atmosphere is challenging because of the low concentration of carbon dioxide in the atmosphere. Even though the theoretical minimum energy requirement for removing carbon dioxide from the air is quite small (roughly 22 kJ/mol), most practical processes involve large inefficiencies which make it difficult to operate near the theoretical optimum. In addition, the energy required for purifying and compressing the product stream is also substantial.

The efficient purification and compression of the product stream is crucial to widespread adoption of new carbon capture technologies. Industrial applications running at scale need to be pipeline-ready or well-ready, with high pressure (i.e., above the supercritical pressure) and extremely low oxygen and water content. Using conventional methods and systems, the energy requirements for these pressures and purities are prohibitive for most applications.

SUMMARY

According to one aspect, a system for collecting a sorbate gas from a sorbent material includes a regeneration vessel having an opening and configured to enclose a sorbent structure that has been physically moved through the opening of the regeneration vessel, the sorbent structure including the sorbent material into which the sorbate gas has been sorbed. The system also includes a liquid water supply communicatively coupled to the regeneration vessel and heated to a first temperature to produce a water vapor, as well as at least one heat pump. Each heat pump of the at least one heat pump includes at least one closed fluidic circuit, at least one heat pump condenser, at least one heat pump evaporator, at least one heat pump pressure reducer, at least one refrigerant, and at least one heat pump compressor. Each closed fluidic circuit includes one of the at least one heat pump condensers, one of the at least one heat pump evaporators, one of the at least one refrigerants, one of the at least one heat pump pressure reducers, and one of the at least one heat pump compressors. The system includes a condenser communicatively coupled to the regeneration vessel and also communicatively coupled to the liquid water supply through a liquid pump, the condenser in thermal contact with a first closed fluidic circuit of the at least one heat pump. The first closed fluidic circuit is also in thermal contact with the liquid water supply such that heat is removed from the condenser at a second temperature lower than the first temperature and provided to the liquid water supply at the first temperature by the first closed fluidic circuit. The system also includes a first compressor communicatively coupled to the condenser. The sorbent structure within the regeneration vessel is placed in fluidic contact with the water vapor from the liquid water supply at the first temperature after the regeneration vessel has been evacuated to a total pressure below the pressure corresponding to the saturated vapor pressure of water at the first temperature. The water vapor comes into contact with the sorbent material, causing a portion of the sorbate gas to be released and form a vapor mixture including the sorbate gas and the water vapor, raising the total pressure to greater than the triple point pressure of the sorbate. The vapor mixture is removed from the regeneration vessel and cooled by the condenser, where a portion of the water vapor within the vapor mixture is condensed into liquid water that is returned to the liquid water supply by the liquid pump. A remainder of the vapor mixture is compressed by the first compressor into a first sorbate product gas. The sorbate gas includes carbon dioxide. The at least one heat pump further includes a second closed fluidic circuit and a third closed fluidic circuit. The first sorbate product gas is in thermal contact with the heat pump evaporator of the second closed fluidic circuit of the at least one heat pump. The second closed fluidic circuit extracts heat from the first sorbate product gas at a third temperature that is less than the second temperature and also less than the melting point of water, resulting in a second sorbate product gas and solid water at the third temperature. The heat extracted by the second closed fluidic circuit is provided by the second closed fluidic circuit to one of the liquid water supply at the first temperature and the first closed fluidic circuit downstream from the heat pump evaporator of the first closed fluidic circuit, at a fourth temperature that is between the second temperature and the first temperature. The second sorbate product gas is in thermal contact with the heat pump evaporator of the third closed fluidic circuit of the at least one heat pump. The third closed fluidic circuit extracts heat from the second sorbate product gas at a fifth temperature that is less than the third temperature and also less than the boiling point of the sorbate, resulting in a liquified sorbate and a volatile gas at the fifth temperature.

Particular embodiments may comprise one or more of the following features. The first closed fluidic circuit and the second closed fluidic circuit may belong to the same heat pump. The first closed fluidic circuit, the second closed fluidic circuit, and/or the third closed fluidic circuit may belong to the same heat pump. The sorbent material may be a solid. The sorbent material may include at least one of an ion exchange resin, a functionalized polymer, an activated carbon, a carbonate salt, a phosphate salt, materials containing amine groups, materials containing ammonium groups, and materials containing amine and ammonium groups. The sorbate gas may be removed from the sorbent by means of at least one of temperature swing, pressure swing and moisture swing. The first temperature may be between 40°

C. and 120° C. The second temperature may be between 0° C. and 40° C. The third temperature may be between 0° C. and −56° C. At least a portion of the solid water may be melted and transferred to the liquid water supply. The solid water may be melted using ambient heat. The solid water may be melted using heat provided by one of the at least one heat pump. The volatile gas may include at least one of nitrogen, oxygen, methane, hydrogen and carbon monoxide. The third temperature may be selected sufficiently low such that the water concentration in the second sorbate product gas at the third temperature may be lower than the water solubility concentration in the liquified sorbate at the fifth temperature. The system may further include a mechanical pump configured to receive the liquified sorbate and further increase the pressure of the liquified sorbent. A final pressure of the liquified sorbate may be at least equal to the supercritical pressure of carbon dioxide. The water condensed as liquid water at the second temperature by the condenser may be first heated by ambient heat to a sixth temperature near or below ambient temperature before being returned to the liquid water supply. The first temperature may be increasing such that a temperature difference between the water vapor and the sorbent structure may be minimized during heating.

According to another aspect of the disclosure, a system for collecting a sorbate gas from a sorbent material includes a regeneration vessel configured to enclose a sorbent structure including the sorbent material into which the sorbate gas has been sorbed, and a liquid water supply communicatively coupled to the regeneration vessel and heated to a first temperature to produce a water vapor. The system also includes at least one heat pump, and a condenser communicatively coupled to the regeneration vessel and also communicatively coupled to the liquid water supply through a liquid pump. The condenser is in thermal contact with a first heat pump of the at least one heat pump. The heat pump is also in thermal contact with the liquid water supply such that heat is removed from the condenser at a second temperature lower than the first temperature and provided to the liquid water supply at the first temperature by the first heat pump. The system also includes a first compressor communicatively coupled to the condenser. The sorbent structure within the regeneration vessel is placed in fluidic contact with the water vapor from the liquid water supply at the first temperature after the regeneration vessel has been evacuated to a total pressure below the pressure corresponding to the saturated vapor pressure of water at the first temperature, the water vapor coming into contact with the sorbent material, causing a portion of the sorbate gas to be released and form a vapor mixture including the sorbate gas and the water vapor, raising the total pressure to greater than the triple point pressure of the sorbate. The vapor mixture is removed from the regeneration and cooled by the condenser, where a portion of the water vapor within the vapor mixture is condensed into liquid water that is returned to the liquid water supply by the liquid pump. A remainder of the vapor mixture is compressed by the first compressor into a first sorbate product gas.

Particular embodiments may comprise one or more of the following features. The first sorbate product gas may be in thermal contact with a second heat pump of the at least one heat pump. The second heat pump may extract heat from the first sorbate product gas at a third temperature that may be less than the second temperature and also less than the melting point of water, resulting in a second sorbate product gas and solid water at the third temperature. The heat extracted by the second heat pump of the at least one heat pump may be provided by the second pump to one of the liquid water supply at the first temperature and the first heat pump at a fourth temperature that is between the second temperature and the first temperature. The second sorbate product gas may be in thermal contact with a third heat pump of the at least one heat pump. The third heat pump may extract heat from the second sorbate product gas at a fifth temperature that may be less than the third temperature and also less than the boiling point of the sorbate, resulting in a liquified sorbate and a volatile gas at the fifth temperature. The first heat pump and the second heat pump may be the same heat pump. The first heat pump, the second heat pump, and the third heat pump may be all the same heat pump. The regeneration vessel may include an opening through which the sorbent structure may be physically moved when transitioning between capturing sorbate and releasing sorbate for collection. The sorbate may include carbon dioxide. The at least one heat pump may operate as one of a vapor-compression cycle, a vapor-absorption cycle, a vapor-adsorption cycle, or a thermoelectric refrigerator. Each heat pump of the at least one heat pump may include at least one closed fluidic circuit, at least one heat pump condenser, at least one heat pump evaporator, at least one heat pump pressure reducer, at least one refrigerant, and/or at least one heat pump compressor. Each closed fluidic circuit may include one of the at least one heat pump condensers, one of the at least one heat pump evaporators, one of the at least one refrigerants, one of the at least one heat pump pressure reducers, and one of the at least one heat pump compressors. The first sorbate product gas may be in thermal contact with the heat pump evaporator of a second closed fluidic circuit of the at least one heat pump. The second closed fluidic circuit may extract heat from the first sorbate product gas at a third temperature that may be less than the second temperature and also less than the melting point of water, resulting in a second sorbate product gas and solid water at the third temperature. The heat extracted by the second closed fluidic circuit may be provided by the second closed fluidic circuit to one of the liquid water supply at the first temperature and the first closed fluidic circuit downstream from the heat pump evaporator of the first closed fluidic circuit, at a fourth temperature that may be between the second temperature and the first temperature. The second sorbate product gas may be in thermal contact with the heat pump evaporator of a third closed fluidic circuit of the at least one heat pump. The third closed fluidic circuit may extract heat from the second sorbate product gas at a fifth temperature that may be less than the third temperature and also less than the boiling point of the sorbate, resulting in a liquified sorbate and a volatile gas at the fifth temperature. The first closed fluidic circuit and the second closed fluidic circuit may belong to the same heat pump. The first closed fluidic circuit, the second closed fluidic circuit, and the third closed fluidic circuit may belong to the same heat pump. The sorbent material may be a solid. The sorbent material may include at least one of an ion exchange resin, a functionalized polymer, an activated carbon, a carbonate salt, a phosphate salt, materials containing amine groups, materials containing ammonium groups, and materials containing amine and ammonium groups. The sorbate may be removed from the sorbent by means of at least one of temperature swing, pressure swing and moisture swing. The first temperature may be between 40° c. and 120° c. The second temperature may be between 0° c. and 40° c. The third temperature may be between 0° C. and −56° C. At least a portion of the solid water may be melted and transferred to the liquid water supply. The solid water may be melted using ambient heat. The solid water may be melted using heat provided by one of the at least one heat pump. The volatile gas may include at least one of nitrogen, oxygen, methane, hydrogen and carbon monoxide. The fluid may contain less than or equal to 10 mole % of higher volatility components. The pressure within the regeneration vessel while the sorbent structure is exposed to the water vapor may be between 520 kpa and 3000 kpa. The third temperature may be selected sufficiently low such that the water concentration in the second sorbate product gas at the third temperature may be lower than the water solubility concentration in the liquified sorbate at the fifth temperature. The system may further include a mechanical pump configured to receive the liquified sorbate and further increase the pressure of the liquified sorbent. A final pressure of the liquified sorbate may be at least equal to the supercritical pressure of carbon dioxide. The water condensed as liquid water at the second temperature by the condenser may be first heated by ambient heat to a sixth temperature near or below ambient temperature before being returned to the liquid water supply. The water vapor provided to the regeneration vessel may pressurize and maintain the total pressure of the regeneration vessel at or near a pressure corresponding to the saturated vapor pressure. The regeneration vessel may be maintained at a total pressure that is at least 85% of the saturated pressure of water at the first temperature. A fluidic connection between the liquid water supply at the first temperature and the regeneration vessel may be intermittently closed so that the released sorbate gas increases the total pressure to above the saturated vapor pressure of water vapor at the first temperature. A portion of the water vapor contacting the sorbent material may provide heat to the sorbent material by means of at least one of sensible heat transfer, condensation, absorption, adsorption and exothermic reaction. A portion of water vapor may combine with the sorbate gas so that the total pressure of the regeneration vessel may be greater than the vapor pressure of the sorbate vapor in equilibrium with the sorbent material. The first temperature may be increasing such that a temperature difference between the water vapor and the sorbent structure is minimized during heating. The system may further include at least one nozzle inside the regeneration vessel and communicatively coupled to the liquid water supply. The water vapor may be introduced to the regeneration vessel when heated liquid water from the liquid water supply passes through the at least one nozzle and a portion of the heated liquid water expands into the water vapor, creating a hot mist comprising the water vapor and water droplets. The system may further include a second liquid pump in fluid communication with the liquid water supply, pressurizing the heated liquid water delivered to the at least one nozzle inside the regeneration vessel. The second sorbate product gas may be condensed within a distillation unit that may be in thermal contact with the second heat pump of the at least one heat pump, the distillation unit condensing the second sorbate product gas into a liquified sorbate and a volatile gas. The second sorbate product gas may be condensed within a distillation unit that may be in thermal contact with the heat pump evaporator of the second closed fluidic circuit of the at least one heat pump, the distillation unit condensing the second sorbate product gas into a liquified sorbate and a volatile gas. The system may further include a fourth heat pump of the at least one heat pump. The fourth heat pump and the second heat pump may be intermittently in fluidic contact with the first sorbate product gas such that when one of the fourth heat pump and the second heat pump is in fluid contact with the first sorbate product gas the other of the fourth heat pump and the second heat pump may be isolated from the first sorbate product gas. The fourth heat pump may extract heat from the first sorbate product gas at the third temperature, resulting in the second sorbate product gas and solid water at the third temperature. The system may be configured such that when one of the fourth heat pump and the second heat pump may be in fluid contact with the first sorbate product gas, at least a portion of the solid water in thermal contact with the other of the fourth heat pump and the second heat pump may be melted and transferred to the liquid water supply. The system may further include a fourth closed fluidic circuit of the at least one heat pump. The fourth closed fluidic circuit and the second closed fluidic circuit may be intermittently in fluidic contact with the first sorbate product gas such that when one of the fourth closed fluidic circuit and the second closed fluidic circuit is in fluid contact with the first sorbate product gas the other of the fourth closed fluidic circuit and the second closed fluidic circuit may be isolated from the first sorbate product gas. The fourth closed fluidic circuit may extract heat from the first sorbate product gas at the third temperature, resulting in the second sorbate product gas and solid water at the third temperature. The system may be configured such that when one of the fourth closed fluidic circuit and the second closed fluidic circuit is in fluid contact with the first sorbate product gas, at least a portion of the solid water in thermal contact with the other of the fourth closed fluidic circuit and the second closed fluidic circuit is melted and transferred to the liquid water supply.

According to yet another aspect of the disclosure, a method for collecting a sorbate gas from a sorbent material includes containing a sorbent structure inside a regeneration vessel, the sorbent structure including the sorbent material into which the sorbate gas has been sorbed. The method also includes producing a water vapor by providing heat at a first temperature to a liquid water supply, reducing the total pressure of the regeneration vessel to below the pressure corresponding to the saturated vapor pressure of water at the first temperature, and introducing the water vapor at the first temperature to the regeneration vessel, placing the water vapor in fluidic contact with the sorbent material and causing a portion of the sorbate gas to be released and form a vapor mixture including the sorbate gas and the water vapor, raising the total pressure within the regeneration vessel to greater than the triple point pressure of the sorbate. The method includes allowing the vapor mixture to leave the regeneration vessel by placing the vapor mixture in fluidic contact with a condenser that is communicatively coupled to the regeneration vessel and also communicatively coupled to the liquid water supply through a liquid pump, the condenser in thermal contact with a first heat pump that is also in thermal contact with the liquid water supply, the first heat pump being one of at least one heat pumps. The method also includes removing heat from the vapor mixture at a second temperature that is lower than the first temperature using the first heat pump, causing a portion of the water vapor in the vapor mixture to condense into liquid water, providing the heat removed from the vapor mixture at the second temperature to the liquid water supply at the first temperature, and returning the liquid water condensed from the vapor mixture to the liquid water supply using the liquid pump. Finally, the method includes compressing a remainder of the vapor mixture with a first compressor communicatively coupled to the condenser, forming a first sorbate product gas.

Particular embodiments may comprise one or more of the following features. The method may further include extracting heat from the first sorbate product gas at a third temperature with a second heat pump that is in thermal contact with the first sorbate product gas, resulting in a second sorbate product gas and solid water at the third temperature. The third temperature may be less than the second temperature and also less than the melting point of water. The method may further include providing the heat extracted by the second heat pump of the at least one heat pump to one of the liquid water supply at the first temperature and the first heat pump at a fourth temperature that is between the second temperature and the first temperature. The method may further include extracting heat from the second sorbate product gas at a fifth temperature with a third heat pump that is in thermal contact with the second sorbate product gas, resulting in a liquified sorbate and a volatile gas at the fifth temperature. The fifth temperature may be less than the third temperature and also less than the boiling point of the sorbate. The first heat pump and the second heat pump may be the same heat pump. The first heat pump, the second heat pump, and the third heat pump may be the same heat pump. The method may further include physically moving the sorbent structure into the regeneration vessel through an opening of the regeneration vessel before reducing the total pressure of the regeneration vessel. The sorbate may include carbon dioxide. The at least one heat pump may operate as one of a vapor-compression cycle, a vapor-absorption cycle, a vapor-adsorption cycle, or a thermoelectric refrigerator. Each heat pump of the at least one heat pump may include, at least one closed fluidic circuit, at least one heat pump condenser, at least one heat pump evaporator, at least one heat pump pressure reducer, at least one refrigerant, and at least one heat pump compressor. Each closed fluidic circuit may include one of the at least one heat pump condensers, one of the at least one heat pump evaporators, one of the at least one refrigerants, one of the at least one heat pump pressure reducers, and one of the at least one heat pump compressors. The method may include extracting heat from the first sorbate product gas at a third temperature with a second closed fluidic circuit of the at least one heat pump that is in thermal contact with the first sorbate product gas, resulting in a second sorbate product gas and solid water at the third temperature. The third temperature may be less than the second temperature and also less than the melting point of water. The method may include providing the heat extracted by the second closed fluidic circuit to one of the liquid water supply at the first temperature and the first closed fluidic circuit downstream from the heat pump evaporator of the first closed fluidic circuit at a fourth temperature that is between the second temperature and the first temperature. The method may include extracting heat from the second sorbate product gas at a fifth temperature with a third closed fluidic circuit of the at least one heat pump that is in thermal contact with the second sorbate product gas, resulting in a liquified sorbate and a volatile gas at the fifth temperature. The fifth temperature may be less than the third temperature and also less than the boiling point of the sorbate. The first closed fluidic circuit and the second closed fluidic circuit may belong to the same heat pump of the at least one heat pump. The first closed fluidic circuit, the second closed fluidic circuit, and the third closed fluidic circuit may belong to the same heat pump of the at least one heat pump. The sorbent material may be a solid. The sorbent material may include at least one of an ion exchange resin, a functionalized polymer, an activated carbon, a carbonate salt, a phosphate salt, materials containing amine groups, materials containing ammonium groups, and materials containing amine and ammonium groups. The sorbate may be removed from the sorbent by means of at least one of temperature swing, pressure swing and moisture swing. The first temperature may be between 40° C. and 120° C. The second temperature may be between 0° c. and 40° c. The third temperature may be between 0° C. and −56° C. The method may include melting at least a portion of the solid water and adding said water to the liquid water supply. The solid water may be melted using ambient heat. The solid water may be melted using heat provided by one of the at least one heat pump. The volatile gas may include at least one of nitrogen, oxygen, methane, hydrogen and carbon monoxide. The fluid may contain less than or equal to 10 mole % of higher volatility components. The pressure within the regeneration vessel while the sorbent structure is exposed to the water vapor may be between 520 kpa and 3000 kpa. The third temperature may be selected sufficiently low such that the water concentration in the second sorbate product gas at the third temperature is lower than the water solubility concentration in the liquified sorbate at the fifth temperature. The method may include increasing the pressure of the liquified sorbent with a mechanical pump configured to receive the liquified sorbate. A final pressure of the liquified sorbate may be at least equal to the supercritical pressure of carbon dioxide. The method may include heating the liquid water condensed from the vapor mixture to a sixth temperature near or below ambient temperature using ambient heat, before returning the liquid water to the liquid water supply. The water vapor provided to the regeneration vessel may pressurize and maintain the total pressure of the regeneration vessel at or near a pressure corresponding to the saturated vapor pressure. The regeneration vessel may be maintained at a total pressure that is at least 85% of the saturated pressure of water at the first temperature. The method may include intermittently closing a fluidic connection between the liquid water supply at the first temperature and the regeneration vessel, causing the released sorbate gas to increase the total pressure of the regeneration vessel to above the saturated vapor pressure of water vapor at the first temperature. A portion of the water vapor contacting the sorbent material may provide heat to the sorbent material by means of at least one of sensible heat transfer, condensation, absorption, adsorption and exothermic reaction. A portion of the water vapor may combine with the sorbate gas so that the total pressure of the regeneration vessel may be greater than the vapor pressure of the sorbate vapor in equilibrium with the sorbent material. The first temperature may be increasing such that a temperature difference between the water vapor and the sorbent structure is minimized during heating. The method may include using the volatile gas at the fifth temperature as a heat sink. The method may include using the volatile gas at the fifth temperature to produce useful work. The method may include using the volatile gas at the fifth temperature as a source of dry gas as part of a drying process. The method may include using the volatile gas at the fifth temperature as a source of dry gas for the operation of a pneumatic device. Producing the water vapor may include passing heated liquid water from the liquid water supply through at least one nozzle, the nozzle being inside the regeneration vessel and communicatively coupled to the liquid water supply. A portion of the heated liquid water may expand into the water vapor creating a hot mist comprising the water vapor and water droplets, within the regeneration vessel. The method may include pressurizing the heated liquid water delivered to the at least one nozzle inside the regeneration vessel with a second liquid pump in fluid communication with the liquid water supply. The method may include condensing the second sorbate product gas within a distillation unit that may be in thermal contact with the second heat pump, the distillation unit condensing the second sorbate product gas into a liquified sorbate and a volatile gas. The method may include condensing the second sorbate product gas within a distillation unit that is in thermal contact with the heat pump evaporator of the second closed fluidic circuit of the at least one heat pump, the distillation unit condensing the second sorbate product gas into a liquified sorbate and a volatile gas. The method may include intermittently placing the second heat pump and a fourth heat pump in fluidic contact with the first sorbate product gas such that when one of the fourth heat pump and the second heat pump is in fluid contact with the first sorbate product gas the other of the fourth heat pump and the second heat pump is isolated from the first sorbate product gas. The method may include extracting heat from the first sorbate product gas at the third temperature with the fourth heat pump resulting in the second sorbate product gas and solid water at the third temperature. The method may include melting at least a portion of the solid water in thermal contact with one of the fourth heat pump and the second heat pump while the other of the fourth heat pump and the second heat pump is in fluid contact with the first sorbate product gas. The method may include transferring the liquid water from the portion of the solid water that was melted to the liquid water supply. The method may include intermittently placing the second heat pump and a fourth closed fluidic circuit in fluidic contact with the first sorbate product gas such that when one of the fourth closed fluidic circuit and the second closed fluidic circuit is in fluid contact with the first sorbate product gas the other of the fourth closed fluidic circuit and the second closed fluidic circuit is isolated from the first sorbate product gas. The method may include extracting heat from the first sorbate product gas at the third temperature with the fourth closed fluidic circuit resulting in the second sorbate product gas and solid water at the third temperature. The method may include melting at least a portion of the solid water in thermal contact with one of the fourth closed fluidic circuit and the second closed fluidic circuit while the other of the fourth closed fluidic circuit and the second closed fluidic circuit is in fluid contact with the first sorbate product gas. The method may include transferring the liquid water from the portion of the solid water that was melted to the liquid water supply.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
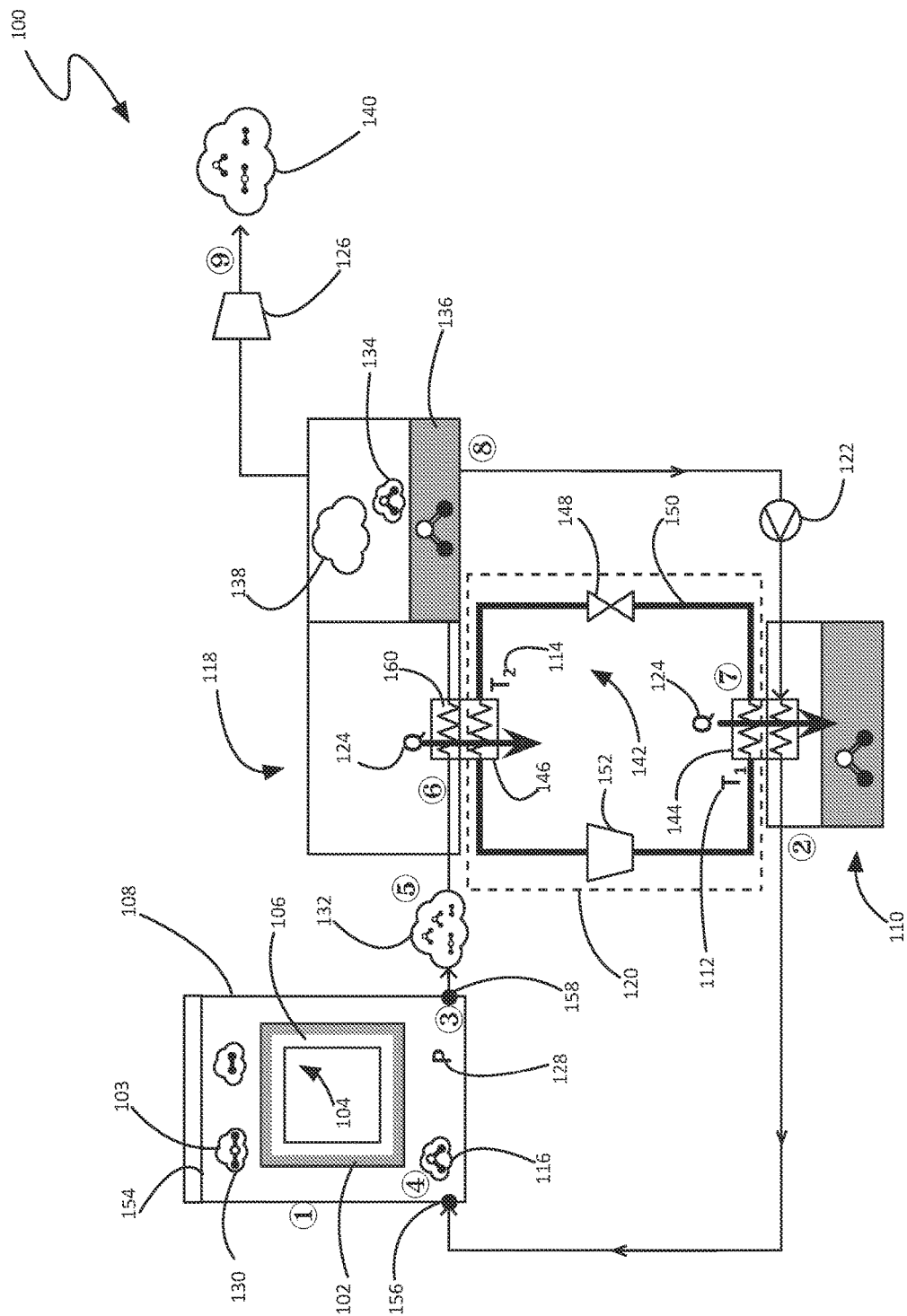
FIG. 1 is a schematic view of a sorbate collection system and method.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems and is not intended to limit the broad aspect of the disclosed concepts to the embodiments illustrated.

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric carbon dioxide collectors can quickly overrun a tight energy budget for drawing in and processing air in bulk.

Capturing carbon dioxide from the atmosphere is challenging because of the low concentration of carbon dioxide in the atmosphere. Even though the theoretical minimum energy requirement for removing carbon dioxide from the air is quite small (roughly 22 kJ/mol), most practical processes involve large inefficiencies which make it difficult to operate near the theoretical optimum. In addition, the energy required for purifying and compressing the product stream is also substantial.

The efficient purification and compression of the product stream is crucial to widespread adoption of new carbon capture technologies. Industrial applications running at scale need to be pipeline-ready or well-ready, with high pressure (i.e., above the supercritical pressure) and extremely low oxygen and water content. Using conventional methods and systems, the energy requirements for these pressures and purities are prohibitive for most applications.

Contemplated herein is a system and method for capturing atmospheric carbon dioxide in a resource-efficient manner. Specifically, contemplated herein is a system and method that makes it possible to efficiently recover carbon dioxide, or other sorbate gases, from a sorbent, then purify the sorbate and produce a compressed stream of sorbate gas, or a condensed liquid form of the sorbate. This disclosure describes systems, devices, and processes to combine thermal, pressure, and moisture swing approaches to minimize energy consumption and other costs in the process design. According to various embodiments, the contemplated system and method uses steam as a carrier or sweep gas. Some embodiments also use the condensation and evaporation of water as the mechanism for delivering and removing heat from the system and employ a separation technology that produces essentially pure carbon dioxide at high pressure, while generating all or nearly all of the required heat within the gas compression and purification unit via mechanical equipment.

As will be discussed below, according to various embodiments, both the energy required for heating and the water consumed are substantially recovered for improved overall energy efficiency and lower utility requirements for gas separation. The excess energy (e.g., the energy beyond the energy directly consumed by sorbate desorption) is substantially recovered by cooling and condensing the water vapor in the product effluent as well as additional water vapor removed from a regeneration vessel via evaporative cooling. The sensible and vaporization heat removed during cooling and condensing is upgraded with the use of one or more heat pumps, and subsequently used to generate steam. In some embodiments, this water vapor is generated using the water that is substantially recovered for reuse. This all results in the specific energy requirement and water consumption of the process to be minimized.

Using the systems and methods contemplated herein, it is possible to take low-grade carbon dioxide pulled from the atmosphere and generate purified, liquid carbon dioxide, using a fraction of the resources (e.g., energy, water, etc.) consumed by conventional systems and methods. As will be discussed below, is made possible by adapting the concept of cascade refrigeration to work in harmony with a purification and pressurization process.

While much of the following discussion is done in the context of a system extracting carbon dioxide from a stream of ambient air, it should be noted that the systems and methods contemplated herein may be applied to other sorbents and sorbate gases, taken from the atmosphere or otherwise. For example, some embodiments are adapted to removing carbon dioxide from flue gas, or other gases from a mixture.

In general, sorption/desorption systems involve changes in one or more process conditions to promote binding of a sorbate to the sorbent in one part of the cycle, and the release of the sorbate from the sorbent in a different part of the cycle. Process variables that might be changed to swing the sorbent behavior from sorption to desorption and back include a change in temperature, pressure, or the presence of other chemical compounds. For gaseous sorbates an increase of temperature will raise the equilibrium partial pressure of the sorbate and thus promote the release of the sorbate. Conversely, at constant temperature, a drop in the partial pressure of the sorbate over the sorbent will reverse the reaction between sorbent and sorbate from sorption to desorption. Moreover, it is possible to affect the release of the sorbate by introducing another chemical. This might simply be another sorbate that competitively binds to the sorbent and dislodges the sorbate of interest, or a reaction of the other chemical with the sorbent and/or sorbate affects the strength of the binding of the sorbate to the sorbent. This latter situation is present in the case of the moisture swing of the sorbents which have been described in other disclosures and in the research literature. It should be noted that the moisture swing is not simply caused by water displacing carbon dioxide from the sorbent; the presence of water fundamentally weakens the interaction between the sorbate (e.g., carbon dioxide, etc.) and the sorbent, and thus induces the release of the sorbate. If this were not the case, the water once bound could not be released by simply exposing the sorbent to ambient conditions.

FIG. 1 is a schematic view of a non-limiting example of an efficient sorbate collection system (hereinafter collection system or system). As shown, the system 100 comprises a regeneration vessel 108 configured to enclose a sorbent structure 104, a liquid water supply 110, at least one heat pump 120, a compressor 126, and a condenser 118. In some embodiments, the system 100 may also comprise a liquid pump 122, and some additional heat source (not shown). Each of these elements will be discussed in detail, below.

The regeneration vessel 108 is configured to enclose a sorbent structure 104 comprising a sorbent material 106 into which a sorbate gas 102 has been sorbed. It should again be noted that while this disclosure is focused on non-limiting examples of systems and methods for the efficient collection of carbon dioxide, the systems and methods contemplated herein may be adapted for use with other sorbent materials targeting other sorbate gases.

The regeneration vessel 108 encloses the sorbate structure 104 sufficient to expose it to elevated temperature and/or pressure reduction to free the sorbed sorbate gas 102 from the sorbent material 106. In some embodiments, including the non-limiting example shown in FIGS. 1-6, the regeneration vessel 108 may be configured to receive a sorbent structure 104 that is physically moved inside the vessel 108 through an opening 154 after loading the sorbent material 106 with sorbate gas 102 from the desired source, such as atmospheric air. In some embodiments, the sorbate 102 may be captured by the sorbent structure 104 from atmospheric air conveyed to the sorbent structure 104 by natural convection, while in other embodiments, the sorbate 102 may be captured from a driven air flow.

In some embodiments, the sorbent material 106 may be a solid material, while in other embodiments, the sorbent 106 may be a liquid held in a solid material such that it is exposed to the surrounding atmosphere. Exemplary sorbents 106 include, but are not limited to, ion exchange resins, functionalized polymers, activated carbons, carbonate salts, phosphate salts, or other materials containing amine groups, ammonium groups and amine and ammonium groups. There are many ways to foster the release of the sorbate 102 from the sorbent 106 including, but not limited to, the use of heat (i.e., temperature swing), the use of low pressures (i.e., pressure swing), and the addition of moisture (i.e., moisture swing) to the regeneration process. Important to this approach is that the presence of water 136 does not prevent the release of the sorbate 102, according to various embodiments. As mentioned above, in some embodiments, the sorbate 102 may be captured from ambient atmosphere, while in other embodiments, it may be captured from a more specific source, such as the output of a combustion process or the like.

In some embodiments, the sorbent structure 104 containing the sorbent material 106 is placed in fluid contact with the atmosphere or ambient air flows, so that one or more constituent sorbates 102 are sorbed into the sorbent 106. Once laden with sorbate 102, the sorbent structure 104 is contained within a stationary regeneration vessel 108. In some embodiments, the sorbent structure 104 may be separated from the atmosphere by physically moving the sorbent structure 104 into the regeneration vessel 108. After the sorbate 102 has been released and captured, the sorbent structure 104 may be moved out of the vessel 108 to capture more sorbate 102. This is repeated to provide an intermittent effluent of desorbed sorbate 102. In some embodiments, a plurality of sorbent structure 104 and regeneration vessels 108 may be operated out of sequence, such that the combined effluent flow is provided at near steady-state rate.

As shown, a liquid water supply 110 is communicatively coupled to the regeneration vessel 108. In some embodiments, this fluidic communication may be uninterrupted, while in other embodiments, it may be controllable through a fluidic connection 156, such as a valve or the like, that allows for the fluidic communication between the regeneration vessel 108 and the liquid water supply 110 to be interrupted, as will be discussed further, below.

The system 100 also comprises at least one heat pump 120. According to various embodiments, the one or more heat pumps 120 operate as one of a vapor-compression cycle, a vapor-absorption cycle, a vapor-adsorption cycle, or a thermoelectric refrigerator, as is known in the art. For example, in some embodiments, the heat pump may have one or more closed fluid circuits 142, each circuit 142 having one or more refrigerants 150, one or more evaporators 146, one or more compressors 152, one or more condensers 144 and one or more pressure reducers 148. As shown, the heat pump 120 interacts with the other components of the system 100 through heat exchangers 160 centered on (e.g., system 100 of FIG. 1, etc.), or between (e.g., system 300 of FIG. 3, etc.) the heat pump condenser 144 and heat pump evaporator 146. The heat pump(s) 120 may employ refrigerants 150 selected from R-12, R-13, R-22, R-23, R-134a, R-152a, R-E170, R-290, R-502, R-503, R-507, R-508B, R-1234yf, R-404A, R-407A, R-600, R-600a, R-630, R-631, R-717, R-764, and R-744, according to various embodiments.

The following is a non-limiting example of a method for the efficient collection of a sorbate gas 102 using the system 100 contemplated herein. First, the sorbent structure 104, laden with sorbate gas 102 (e.g., carbon dioxide 103, etc.), is placed in the regeneration vessel 108. See 'circle 1'.

The non-limiting example shown in FIG. 1 is a simple frame structure covered with a sorbent material 106 that has been placed within the regeneration vessel 108. However, those skilled in the art will recognize that this system 100 may be used with any implementation of a sorbent structure 104 having an appropriate sorbent material 106 such as the examples given above, that can be enclosed within the regeneration vessel 108 (e.g., a structure 104 that can be physically moved inside the vessel 108 when transitioning between capturing sorbate 102 and releasing sorbate 102 for collection, etc.).

The water within the liquid water supply 110 is heated so that water vapor 116 may be provided to the regeneration vessel 108. See 'circle 2'. As shown, the water vapor 116 will be provided to the sorbent material 106 within the regeneration vessel 108 at a first temperature 112. In some embodiments, the first temperature 112 may be between 40° C. and 120° C. In some embodiments, the first temperature 112 may be roughly 80° C. It should be noted that the choice of temperature is in part dictate by the pressure in which the water vapor 116 will be interacting with the sorbent material 106.

As will be discussed below, the liquid water supply 110 receives heat 124 recovered from the water vapor 116 as it condenses further into the system 100. In some embodiments, the liquid water supply 110 may also be heated by additional heat pumps 120 and/or with other heat sources, if needed.

As the sorbent structure 104 is physically moved into the regeneration vessel 108 in some embodiments, the vessel 108 is filled with other atmospheric gases, particularly volatile gases that will need to be removed further into a purification process, at an energetic expense. Hence, it is advantageous to remove as much of these contaminant gases (e.g., nitrogen, oxygen, etc.) from the regeneration vessel 108 before releasing the sorbate gas 102. Additionally, in some embodiments, the water vapor 116 to be released within the vessel 108 may be at atmospheric or sub-atmospheric pressure, which may be predicated by evacuating the vessel 108 before the release of water vapor 116. Of course, in other embodiments, the water vapor 116 may be at higher pressures, as will be discussed, below.

After the vessel 108 has been closed, the total pressure 128 of the regeneration vessel 108 is reduced. See 'circle 3'. According to various embodiments, the vessel 108 may be evacuated to a total pressure 128 that is below the pressure corresponding to the saturated vapor pressure of water at the first temperature 112 (i.e., the temperature the water vapor/steam is delivered to the vessel 108 at in 'circle 4'). As an option, in some embodiments sorbate gas 102 and/or water vapor 116 may be used to sweep out any residual undesirable gas components from the regeneration vessel 108 before evacuation.

In some embodiments, the total pressure 128 of the vessel 108 may be reduced by the compressor 126 in fluid communication with the condenser 118, while in other embodiments, the pressure 128 of the vessel 108 may be reduced using a different compressor (e.g., see second compressor 616 of FIG. 6, etc.), or through a different mechanism.

Once the sorbent structure 104 with laden sorbent material 106 is sealed within the regeneration vessel 108, it is exposed to heat and moisture, through steam/water vapor, as part of the regeneration cycle. See 'circle 4'. The water vapor 116 is introduced to the vessel 108 at the first temperature 112, placing the water vapor 116 in fluidic contact with the sorbent material 106 and causing a portion 130 of the sorbate gas 102 to be released and form a vapor mixture 132 comprising the sorbate gas 102 and the water vapor 116, raising the total pressure 128 within the regeneration vessel 108 to greater than the triple point pressure of the sorbate 102. This water vapor drives condensation on surfaces. and causes a uniform heating of the sorbent 106 in the vessel 108, thus promoting an increase in the partial pressure of sorbate 102 within the vessel 108.

According to various embodiments, a portion of the water vapor 116 contacting the sorbent 108 provides heat to the sorbent 108 by means of at least one of sensible heat transfer, condensation, absorption, adsorption and exothermic reaction. In some embodiments, the water vapor 116 at the first temperature 112 pressurizes and maintains the pressure of the regeneration vessel 108 at or near a pressure corresponding to the saturated vapor pressure. In other embodiments, the regeneration vessel 108 is maintained at a pressure greater than or equal to 85% of the saturated pressure of water at the first temperature 112. This water vapor 116 expands into the vessel 108 which is at a lower pressure.

In some embodiments, the liquid water supply 110 does not require much heat to cause water vapor 116 to form within the vessel 108, which was previously evacuated. Opening the vessel 108 and exposing the liquid water supply 110 to the reduced pressure may cause the spontaneous formation of the water vapor 116 within the vessel.

In some embodiments, the fluidic connection 156 between the liquid water supply 110 at the first temperature 112 and the regeneration vessel 108 is intermittently closed. This allows the desorbing sorbate 102 to increase the total pressure 128 to a level above the saturated vapor pressure of the water vapor 116 at the first temperature 112.

It should be noted that, in some embodiments, while the water vapor 116 arriving in the vessel 108 is at the first temperature 112, in some embodiments the interior of the vessel 108 may be slightly hotter than the first temperature 112, due to the nature of how the water binds with the sorbent material 106. In other embodiments, the sorbent structure 104 and the sorbent material 106 may also be at, or close to, the first temperature 112.

In some embodiments, as the system 100 continues to process the sorbate gas 102, the first temperature 112 may be increasing, such that a temperature difference between the water vapor 116 and the sorbent structure 104 is minimized during heating. Additionally, in some embodiments, the pressure 128 within the regeneration vessel 108 while the sorbent structure 104 is exposed to the water vapor 116 may be between 520 kPa and 3000 kPa.

According to various embodiments, the water vapor 116 provided to the regeneration vessel 108 pressurizes and maintains the total pressure 128 of the regeneration vessel 108 at or near a pressure corresponding to the saturated vapor pressure. In some embodiments, a portion of water vapor 116 combines with the sorbate gas 102 so that the total pressure 128 of the regeneration vessel 108 is greater than the vapor pressure of the sorbate vapor 102 in equilibrium with the sorbent material 106.

In some embodiments, the water vapor 116 at the first temperature 112 is formed within the liquid water supply 110 and enters the regeneration vessel 108 already formed. In other embodiments, the water may remain in a heated, liquid state as it travels to the regeneration vessel 108 where it rapidly expands and forms, at least in part, the water vapor 116. As shown, in some embodiments, the liquid water supply 110 may be communicatively coupled to a liquid pump 112 which may pressurize the liquid water within the supply 110. In other embodiments, the heat and moisture may be delivered to the sorbent material 106 within the vessel 108 in a different manner or form, as will be discussed in the context of FIG. 6, below.

Next, the vapor mixture 132, comprising water vapor 116 and sorbate gas 102, is removed from the regeneration vessel 108. See 'circle 5'. In some embodiments, the vapor mixture 132 is removed using an evacuation system such as a condenser and/or vacuum compressor. For example, in one embodiment, the first compressor 126 may be used to pull the vapor mixture 132 out of the regeneration vessel 108. In another embodiment, a separate device may be used, such as the second compressor 616 of FIG. 6. In some embodiments, during a regeneration cycle, a portion of water vapor 116 combines with the sorbate gas 102, resulting in a total pressure 128 that is greater than the vapor pressure of the sorbate gas 102 while in equilibrium with the sorbent 108.

In still other embodiments, the vapor mixture 132 may be swept out of the regeneration vessel 108, pushed out by a sweep gas introduced to the regeneration vessel 108 to displace the vapor mixture 132. In some embodiments, additional water vapor 116 may be used as a sweep gas, while in other embodiments, bursts of the sorbate gas 102 itself may be used.

In other embodiments, the vapor mixture 132 may be pulled out of the regeneration vessel 108 upon being exposed to the much colder condenser 118 fluidically coupled to the regeneration vessel 108. In some embodiments, a continuous stream of vapor mixture 132 may be pulled out of the regeneration vessel 108 or a plurality of regeneration vessels 108 whose sorbent structures 104 are at various stages of sorbate depletion, permitting a near-constant stream of vapor mixture 132. A continuous stream of vapor mixture 132 from a single regeneration vessel 108 is complicated by the fact that, as the sorbent material 106 unloads the captured sorbate gas 102, the partial pressure of the sorbate gas 102 in the vessel 108 will go down with a continuous product stream.

In other embodiments, however, the fluidic communication between the regeneration vessel 108 and the condenser 118 may be intermittent. For example, in some embodiments, a fluidic connection 158 such as a valve may be used to control the fluidic communication between the regeneration vessel 108 and the condenser 118. In some cases, it may be more efficient to allow the sorbent structure 104 to dwell in the heat and moisture of the water vapor 116 within the regeneration vessel 108, giving the sorbent material 106 time to release the sorbed sorbate gas 102. Closing the fluidic connection 156 between the regeneration vessel 108 and the condenser 118 may allow the total pressure 128 to increase to higher levels as more and more sorbate gas 102 is released from the sorbent material 106. Rather than producing a continuous product stream, these embodiments may be described as operating in a pulsed mode, releasing bursts of vapor mixture 132 whose size and spacing may be modified to achieve an optimal efficiency (or an optimal yield, in some instances).

After being extracted from the regeneration vessel 108, the vapor mixture 138 enters a condenser 118. As shown, the condenser 118 is in thermal contact with a heat pump 120 that is also in thermal contact with the liquid water supply 110. The condenser 118 is also communicatively coupled to both the liquid water supply 110 and a compressor 126. In some embodiments, the condenser 118 is communicatively coupled with the liquid water supply 110 through a liquid pump 122.

According to various embodiments, the heat pump 120 removes heat 124 from the condenser 118, causing at least a portion 134 of the water vapor 116 within the vapor mixture 138 to condense into liquid water 136. See 'circle 6'. This condensing of water results in a remainder 138 of the vapor mixture 138 to increase in concentration of sorbate gas 102, as well as the partial pressure of the sorbate gas 102. Advantageously, this condensation also reduces the volume of the vapor mixture 138, and thus reducing the amount of work that will need to be done by the compressor 126.

In some embodiments, the condenser 118 may be indirect in nature, extracting the heat 124 and condensing the water vapor 116 via thermal contact with a refrigerant 150 through some other medium (e.g., a housing, a coil, etc.). In other embodiments, the condenser 118 may be direct in nature, condensing the water vapor 116 by direct contact with refrigerated liquid water that has been separately cooled by contact with the refrigerant 150. See, for example, the direct condenser 618 of FIG. 6.

This process of separating a portion 134 of the water vapor 116 from the sorbate gas 102 is driven by the removal of heat 124 from the water vapor 116, causing it to condense. As shown, the heat 124 is removed from the condenser 118 at a second temperature 114 (e.g., the water vapor 116 is at a second temperature 114 as it condenses). The second temperature 114 is lower than the first temperature 112. In some embodiments, the second temperature 114 is between 0° C. and 40° C. In other embodiments, the second temperature 114 is between 0° C. and 15° C. In still other embodiments, the second temperature 114 is between the melting point and boiling point of water.

According to various embodiments, the heat 124 is transferred from the water vapor 116 at or near the second temperature 114 to a heat pump evaporator 146. From there, the heat 124 is upgraded and transferred from a heat pump condenser 144 to the liquid water supply 110 at or near the first temperature 112, as shown in 'circle 7'. In some embodiments, the first temperature 112 is continually increasing or is provided at several increasing temperature increments, such that the temperature difference between the water vapor 116 and the sorbent structure 104 is minimized during heating.

As stated above, the heat 124 removed from the vapor mixture 132 extracted from the regeneration vessel 108 is repurposed. The energy required to initially vaporize liquid water to produce water vapor for sorbent regeneration contributes significantly to the overall specific energy to produce a sorbate (e.g., carbon dioxide, etc.) product. A small portion of this energy is associated with the desorption energy of the sorbate gas 102. However, it is desirable to recover as much as feasible of the balance of energy which has gone into heating vapor and materials or is present in the water vapor 116 content of the regeneration vessel 108 effluent (i.e., vapor mixture 132).

A process to do this is removing heat from the water vapor 116 in the regeneration effluent, condensing a portion of it outside of the regeneration vessel 10, and further re-vaporizing a portion of the water condensate in the regeneration vessel 108 by vacuum evaporation followed by also removing heat and condensing a portion of it. The sensible heat removed from the effluent and especially the heat of vaporization removed by condensing the water in the effluent is recovered by heat exchange at a temperature lower than the initial water vaporization temperature. This recovered heat is upgraded to the higher temperature (e.g., from the second temperature 114 to the first temperature 112) by means of the heat pump 120 (or, in some embodiments, a plurality of heat pumps 120) so that it can be used for regeneration heat and steam generation.

In some embodiments, the heat pump 120 may operate as a simple approximation to a Carnot cycle, while in other embodiments it may employ more complex, modern cycles so that the energy consumed in operating the heat pump 120 is much less than the heat 124 that is recovered and transferred. The recovered, upgraded heat 124 is then used to make more water vapor 116, for use in subsequent sorbent regeneration.

The portion 134 of the water vapor 116 that is condensed back into liquid water 136 is returned to the liquid water supply 110, to be reheated at the first temperature 112 using, at least in part, the heat 124 extracted from the condenser 118 by the heat pump 120. See 'circle 8'. As shown, in some embodiments, the reclaimed liquid water 136 is transported back to the liquid water supply 110 by a liquid pump 122 or similar device, in fluid communication with both the condenser 118 and the liquid water supply 110. The heat 124 may be provided to the liquid water 136 by direct or indirect heat transfer, according to various embodiments.

While some water losses may be unavoidable, the reclamation of this resource increases the efficiency of the contemplated system 100. In some embodiments, the contemplated systems may further comprise a source of make-up water, to replace losses due to water vapor 116 lost when the regeneration vessel 108 is opened, or the like. See, for example, make-up water 612 of FIG. 6.

The remainder of the vapor mixture 138 is now separated from the portion 134 of the water vapor 116 that has been condensed by the condenser 118. According to various embodiments, this separation may happen at nearly constant pressure, the result being that the condensation of water vapor 116 effectively pressurizes the remaining gas to a level near the pressure 128 in the regeneration vessel 108. This purified, pressurized sorbate-enriched gas may be removed for further processing, storage, or immediate use. See 'circle 9'. In some embodiments, this gas is sent to a first compressor 126, further pressurizing it, forming a first sorbate product gas 140.

As shown, in some embodiments, the regeneration effluent is compressed after it is passed through the condenser 118, which both purifies and compresses the product gas. In other embodiments, the gas may be compressed before having heat removed by a condenser 118, which may be advantageous in particular embodiments where the resource costs associated with mechanical compression are less than those associated with the heat transfer performed by the condenser 118.

In some embodiments, after the vapor mixture 132 has been extracted from the regeneration vessel 108, the vessel 108 all that it contains (e.g., the sorbent structure 104, etc.) have been heated. Additionally, residual water may remain inside the vessel 108 after the vapor mixture 132 has been substantially removed. In some embodiments, the vessel 108 may be at least partially evacuated, prior to the vessel 108 being opened (e.g., so the sorbent structure 104 can be physically removed, etc.).

Reducing the pressure 128 inside the regeneration vessel 108 will revaporize residual liquid water 136 inside of the vessel 108. Not only can this water vapor 116 be sent to the condenser 118 and at reclaimed to the liquid water supply 110, but the revaporization will also effectively cool the apparatus (e.g., the interior of the vessel 108, the sorbent structure 104, the sorbent material 106, etc.), allowing at least some of that heat 124 to be reclaimed as well.

Some embodiments of the contemplated systems and methods may further comprise mechanisms and procedures for the additional, and resource-efficient, purification and pressurization of the sorbate 102, separating out additional water and higher volatility components while also putting the sorbate 102 in a condition with greater utility in an industrial context. FIGS. 2-6 are schematic views of non-limiting examples of embodiments of the contemplated system and method.

Figure 2:
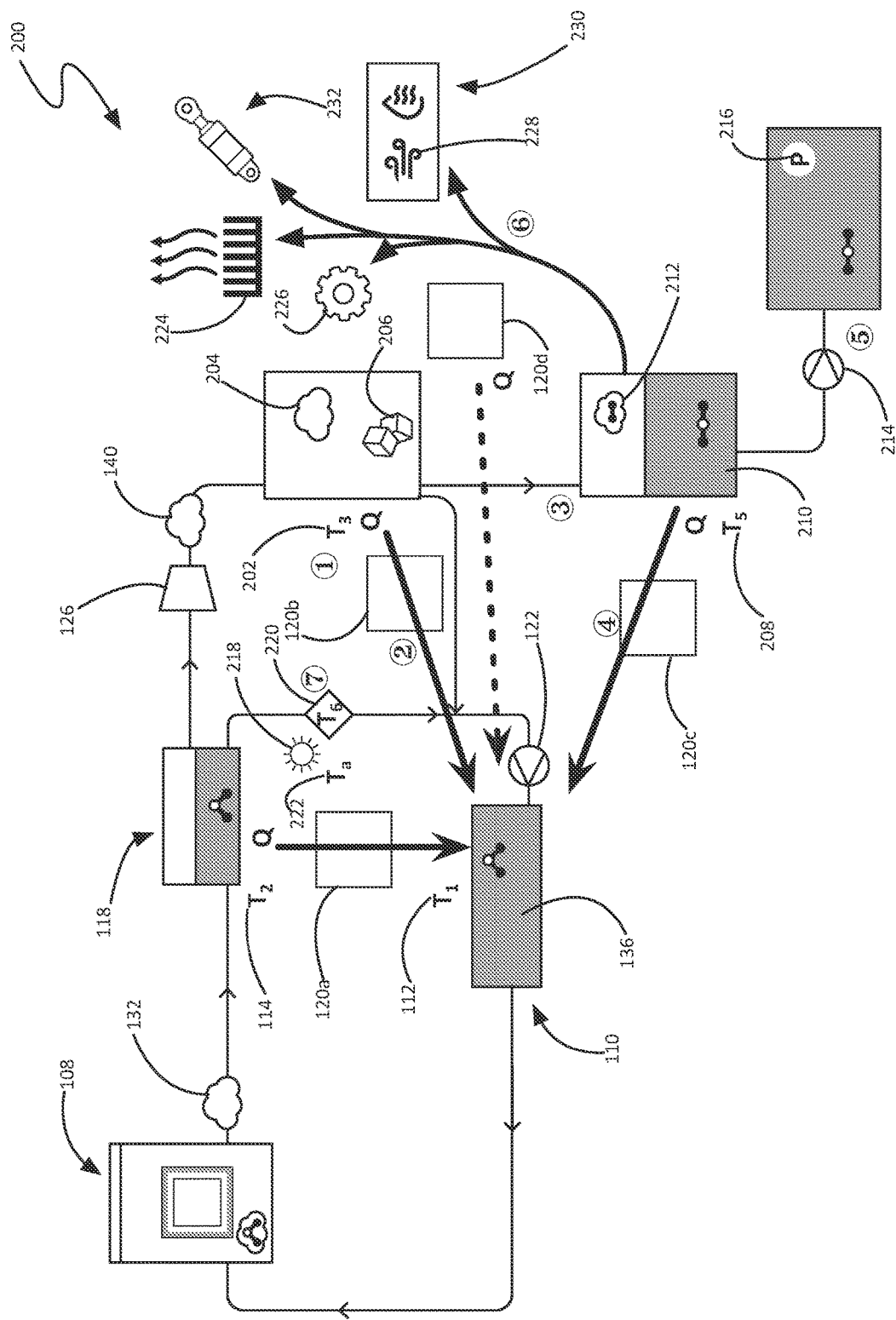
FIG. 2 is a schematic view of another embodiment of a sorbate collection system comprising at least three heat pumps.

FIG. 2 is a schematic view of a non-limiting example of another embodiment of an efficient sorbate collection system. This system 200 picks up where the non-limiting example shown in FIG. 1 left off, providing efficient purification and pressurization of the first sorbate product gas 140 that was the product of that system 100. As shown in FIG. 2, this system 200 is able to continue the process of purification and pressurization using additional heat pumps 120. As previously mentioned, the systems contemplated herein, including the systems 100, 200 of FIGS. 1 and 2, may be implemented using one or more heat pumps 120, which are used to reclaim heat, water, and volatile gases that would otherwise be lost using conventional methods.

As shown, the system 200 comprises, in addition to the regeneration vessel 108, liquid water supply 110, condenser 118, first compressor 126, and liquid pump 122 of the system 100 of FIG. 1, additional heat pumps 120 are in use. Specifically, the system 200 makes use of a first heat pump 120a, a second heat pump 120b, and a third heat pump 120c. The role of each of these heat pumps will be discussed, below.

Before proceeding, though, it should be noted that each of these heat pumps 120abc, like the singular heat pump 120 depicted in FIG. 1, may represent a plurality of heat pumps 120, or one or more heat pumps 120, at least some of which have multiple closed fluidic circuits 142. Heat pumps 120 having multiple closed fluidic circuits 142 will be discussed further in the context of FIGS. 3 and 4, and a heat pump 120 with a single circuit 142 having multiple pressure drops in the context of FIG. 5, below. Additionally, the following discussion with respect to the non-limiting example shown in FIG. 2 will be done in the context of the three representative heat pumps 120, which will be explored in terms of their roles, without delving into their internal structures (e.g., closed fluidic circuits 142, etc.) or the various types of heat pumps 120 that may be employed. As a reminder, according to various embodiments, the heat pump(s) 120 of the contemplated systems may operate with a vapor-compression cycle, a vapor-absorption cycle, a vapor-adsorption cycle, or a thermoelectric refrigerator, as is known in the art. The lack of depiction of some types of heat pumps 120 while discussing the internal structure of various non-limiting embodiments in this disclosure should not be taken as a limitation. Those skilled in the art will recognize that a variety of heat pumps 120 may be adapted to fill the roles of the heat pumps 120 in the present disclosure.

Additionally, it will be noted that some elements that were present in the system 100 shown and discussed in FIG. 1 are not present in the system 200 of FIG. 2. Any omission should not be taken as a limitation. The non-limiting example of a system 100 in FIG. 1, and a wide range of embodiments yielding that same first sorbate product gas 140 comprising a water vapor 116, a sorbate gas 102, and other atmospheric gases (including the volatile gases 212 discussed below) could be combined with the elements of the system 200 discussed below. Any omissions of elements depicted in FIG. 1 were left out for visual clarity and should not be taken as limitations.

Although a substantial amount of water vapor 116 was removed when it condensed into liquid water 136 while passing through the condenser 118 in thermal contact with the first heat pump 120a, there remains sufficient water vapor 116 that it would render the product stream unsuitable for many industrial applications. As shown, the second heat pump 120b, which is in fluidic communication with both the first compressor 126 and a condenser or vessel in thermal contact with the third heat pump 120c, receives the first sorbate product gas 140 from the first compressor 126 at or around the second temperature 114. It should be noted that, in the context of the present description, figures, and the claims that follow, the systems contemplated herein and the elements they are made of comprise sufficient space for the various vapors and liquids that the system is acting on, even if the exact nature of the specific structure is not specified. For example, those skilled in the art will recognize that when the second heat pump 120b is described as cooling the first sorbate product gas 140, drawing away heat 124 and causing water vapor to solidify, those gases and solids may be contained within, or passing through, a vessel or container, a heat exchanger, a condenser, or simply be moving through the system 200 inside conduits that are large enough to hold a volume large enough for the system 200 to operate efficiently. The important aspect, and the feature that the contemplated system is based on, is the removal of heat 124 from intermediate product streams at various points of the collection, purification, and pressurization process, according to various embodiments.

As shown, the first sorbate product gas 140, at approximately the second temperature 114, is in thermal contact with the second heat pump 120b, and further cooled to a third temperature 202 that is less than the melting point temperature of water and greater than the triple point temperature of carbon dioxide 103 (e.g., the sorbate 102). See 'circle 1'. The result is that a portion of the water still in the first sorbate product gas 140 freezes as solid water 206, which is subsequently separated and removed from the fluid. In some embodiments, the third temperature 202 may be at or between 0° C. and −56° C. The result of this cooling is that the first sorbate product gas 140 is split into solid water 206 and a second sorbate product gas 204 that is even more purified than the first sorbate product gas 140.

According to various embodiments, the heat 124 extracted from the first sorbate product gas 140 at the third temperature 202 may be used to provide heat to the liquid water within the liquid water supply 110 (at the first temperature 112). See 'circle 2'.

Finally, the second sorbate product gas 204 is placed in thermal contact with the third heat pump 120c, which extracts heat from the second sorbate product gas 204 which is further cooled to a fifth temperature 208, resulting in a vapor 212 that is substantially composed of the high volatility components and a liquid 210 substantially comprising the sorbate 102 (e.g., carbon dioxide 103). See 'circle 3'. According to various embodiments, the fifth temperature 208 is less than the third temperature 202 and less than the boiling point of the sorbate 102, resulting in a liquified sorbate 210 and a volatile gas at the fifth temperature 208.

According to various embodiments, the third temperature 202 may be selected sufficiently low such that the water concentration in the second sorbate product gas 204 at the third temperature 202 is lower than the water solubility concentration in the liquified sorbate 210 at the fifth temperature 208. In some embodiments, the liquified sorbate 210 may contain less than or equal to 10 mole % of higher volatility components, which may include, but are not limited to, nitrogen, oxygen, methane, hydrogen, carbon monoxide. The fifth temperature 208 may be related to the vapor-liquid equilibrium of the liquified sorbate 210 such that greater than 90% of the higher volatility components remain in the vapor state, here shown as volatile gas 212.

Similar to the other heat pumps 120a and 120b in the contemplated system 200, and according to various embodiments, the heat 124 extracted from the second sorbate product gas 204 at the fifth temperature 208 may be used to provide heat to the liquid water within the liquid water supply 110 at the first temperature 112. See 'circle 4'.

The liquid 210 substantially comprising the sorbate 102 may be subsequently pressurized using a mechanical pump 214. See 'circle 5'. According to various embodiments, the final pressure 216 of the liquid sorbate 210 is at or above the supercritical pressure of the sorbate 102 (e.g., carbon dioxide 103, etc.). In some embodiments, a portion of the sorbate 102 (e.g., carbon dioxide 103) remaining in the vapor 212 that also substantially comprises the high volatility components at the third temperature 202 after the liquefaction of the bulk of the sorbate 102 may be further separated from the volatile gases as a solid (e.g., dry ice), similar to how the remaining water was removed by the second heat pump 120b.

In some embodiments, the extracted high volatility components may be discarded, while in others they may be employed elsewhere in the system 200. For example, in one embodiment, the vapor 212 substantially comprising the high volatility components at the fifth temperature 208 may be used as a heat sink 224 for other processes. In another embodiment, this high volatility component-rich fluid may be depressurized, producing useful work 226. In yet another embodiment, the vapor substantially comprising the high volatility components at the fifth temperature 208 may be used as a source of dry gas 228 for the operation of a drying process 230 and/or pneumatic devices 232. See 'circle 6'.

According to various embodiments, the water 136 extracted by the purification process may be employed elsewhere in the regeneration cycle. For example, in some embodiments, a portion of the water separated as solid 206 at the third temperature 202 may be provided to the liquid water supply 110 to be heated at the first temperature 112 provided by the first heat pump 120a to generate water vapor 116. As an option, the water provided to the liquid water supply 110 may be first heated by ambient heat 218 to a sixth temperature 220 that is near or below the ambient temperature 222. In other embodiments, the solid water 206 may be melted using at least one of ambient heat and heat provided by at least one of the plurality of heat pumps 120.

As previously discussed, the heat 124 removed during cooling to the second temperature 114 (i.e., condensing out liquid water 136), third temperature 202 (i.e., freezing out solid water 206) and fifth temperature 208 (i.e., liquefaction of sorbate 102) may be increased in temperature by one or more heat pumps 120 and used as the heat 124 at the first temperature 112 to generate water vapor 116 for regeneration of the sorbent material 106. According to various embodiments, a heat pump 120 may remove heat 124 at a plurality of temperatures corresponding to the sequential cooling temperatures of the purification process. In some embodiments, heat pumps 120 may comprise multiple closed fluidic circuits 142 that may or may not be in thermal contact with each other. In other embodiments, a heat pump 120 may have a single closed fluidic circuit 142 having multiple pressure drops corresponding to the various sequential cooling temperatures of the purification process.

Figure 3:
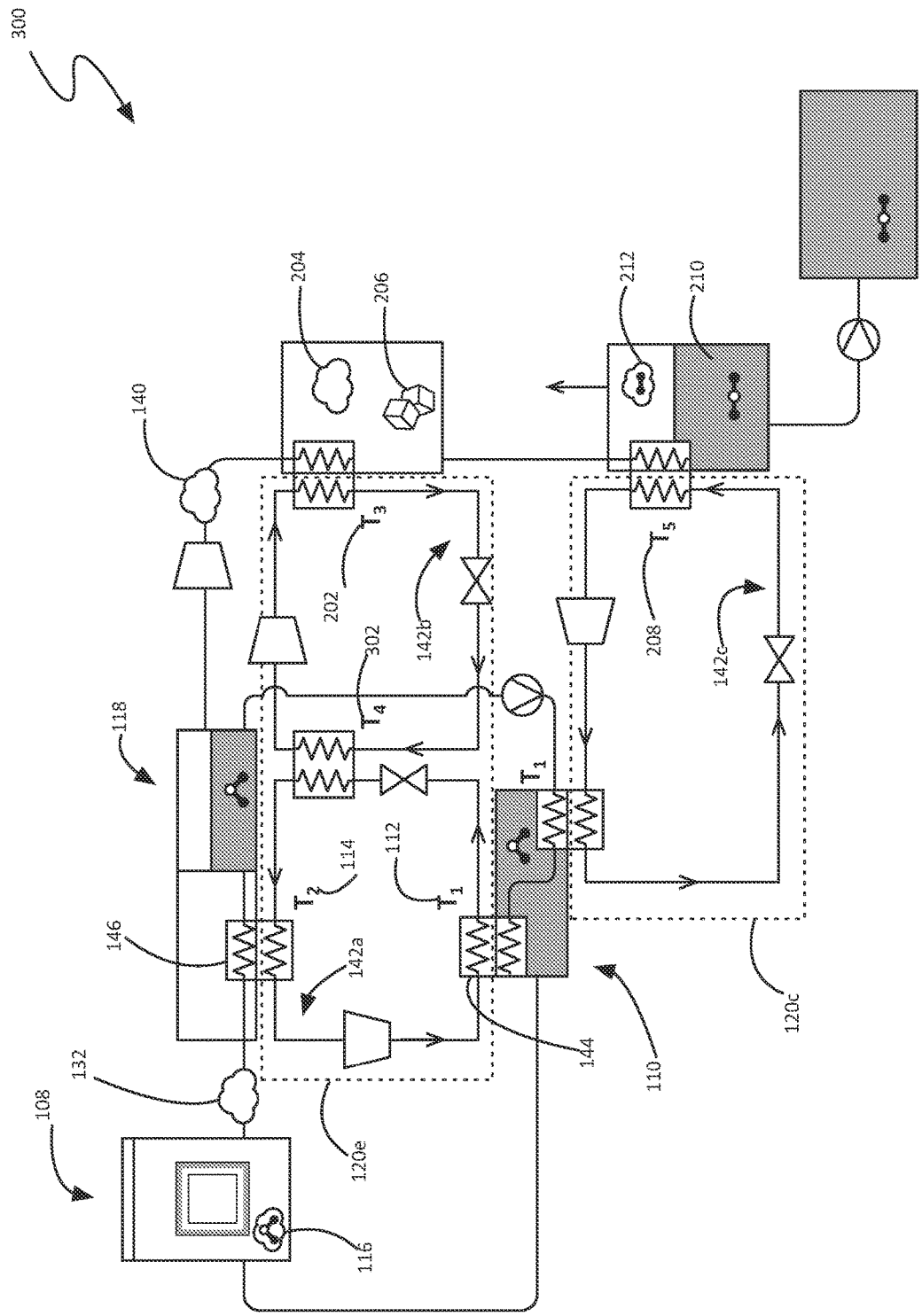
FIG. 3 is a schematic view of a different embodiment of a sorbate collection system comprising at least three heat pumps.
Figure 4:
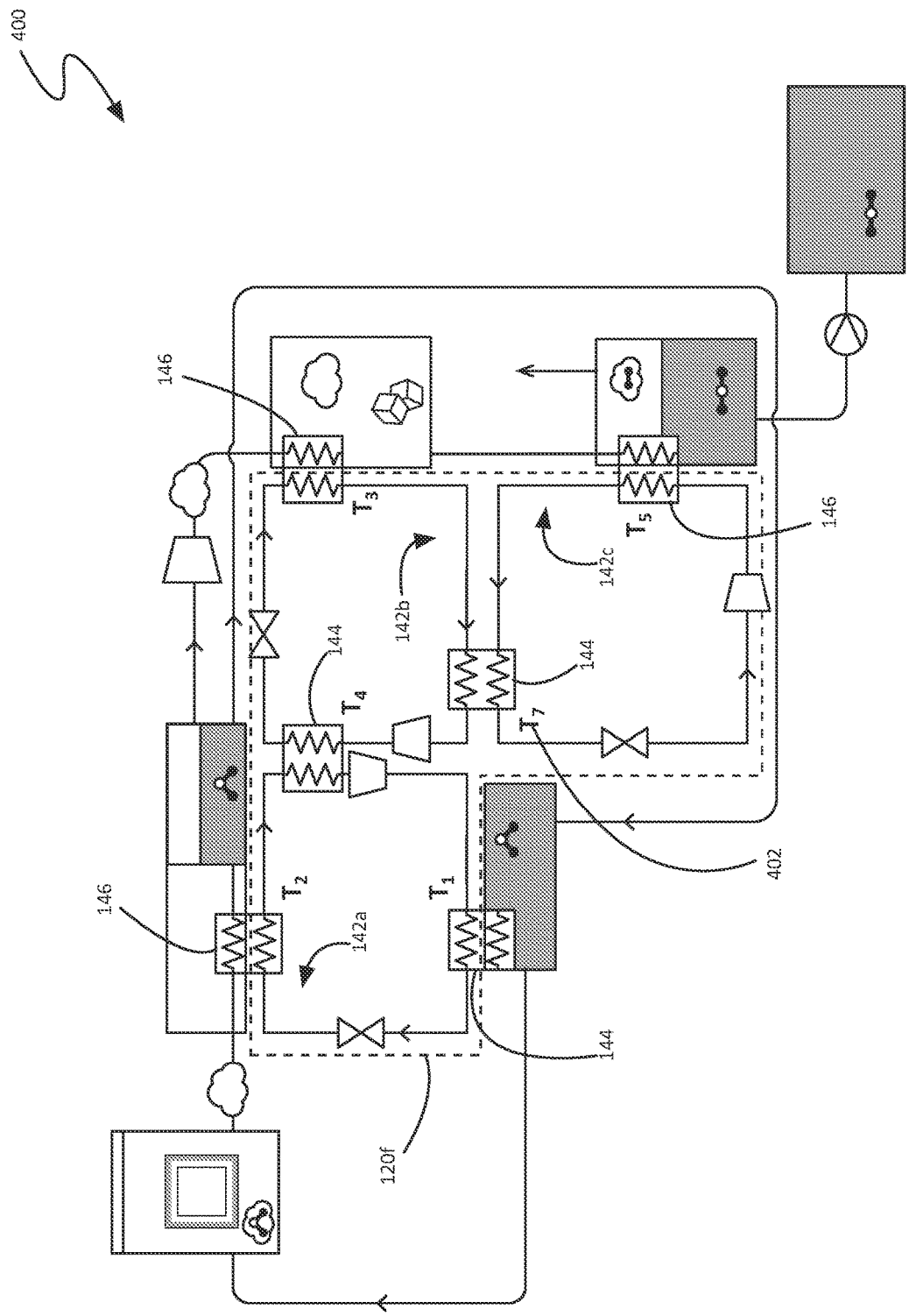
FIG. 4 is a schematic view of an embodiment of a sorbate collection system comprising a single heat pump.

FIGS. 3 and 4 are schematic views of two non-limiting examples of efficient sorbate collection systems 300, 400 making use of heat pumps 120 having multiple, interlinked closed fluidic circuits 142. Specifically, FIG. 3 is a schematic view of a non-limiting example of a system 300 having two heat pumps 120c and 120e, one of which has two connected closed fluidic circuits 142a and 142b. FIG. 4 is a schematic view of a non-limiting example of a system 400 having a single heat pump 120f which comprises three thermally coupled closed fluidic circuits 142a, 142b, and 142c.

In the system 300, shown in FIG. 3, one of two heat pumps 120 has multiple, thermally coupled closed fluid circuits 142. According to various embodiments, a heat pump (e.g., fifth heat pump 120e) may comprise two fluid circuits 142, in which an evaporator 146 of a first fluid circuit 142a operates at or near the second temperature 114, while an evaporator 146 of a second fluid circuit 142b operates at or near the third temperature 202. As shown in FIG. 3, these two closed fluid circuits 142a and 142b are configured in a cascade arrangement, such that a condenser 144 of the second closed fluid circuit 142b transfers heat 124 to an evaporator 146 of the first closed fluid circuit 142a, at a fourth temperature 302. In other embodiments, these two circuits could be in separate heat pumps (e.g., first and second heat pumps 120a,b in FIG. 2, etc.), and still be thermally coupled such that the heat extracted by the second heat pump 120b is provided by the second pump 120b to one of either the liquid water supply 110 at the first temperature 112 or the first heat pump 120a at a fourth temperature 302 that is between the second temperature 114 and the first temperature 112. Put differently, this is the equivalent as if, in the non-limiting example of a system 200 shown in FIG. 2, the first heat pump 120a and the second heat pump 120b were the same heat pump 120. In other embodiments, the heat extracted by the second closed fluidic circuit 142b may be provided by the second closed fluidic circuit 142b to the first closed fluidic circuit 142a downstream from the heat pump evaporator 146 of the first closed fluidic circuit 142a at a fourth temperature 302 that is between the second temperature 114 and the first temperature 112.

This may also be accomplished by a heat pump having a single circuit with two pressure drops, where heat is transferred from the vapor at or near the second temperature to a heat pump evaporator, heat is transferred from the vapor at or near the third temperature to a heat pump evaporator, and finally heat is transferred from a heat pump condenser to the liquid water at or near the first temperature. According to various embodiments, the heat pump comprises one closed fluid circuit and 2 levels of pressure reduction so that one evaporator operates at or near the second temperature and one evaporator operates at or near the third temperature. A heat pump having three levels of pressure reduction will be discussed with respect to FIG. 5, below.

FIG. 4 is a schematic view of a non-limiting example of an embodiment of a sorbate collection system 400 comprising a single heat pump having a plurality of closed fluidic circuits 142 for shifting heat, arranged in a cascade fashion. As shown, this heat pump (e.g., sixth heat pump 120f) is arranged such that the second sorbate product gas 204 is in thermal contact with the heat pump evaporator 146 of a third closed fluidic circuit 142c of the heat pump 120f. The third closed fluidic circuit 142c extracts heat from the second sorbate product gas 204 at a fifth temperature 208 that is less than the third temperature 202 and also less than the boiling point of the sorbate 102, resulting in a liquified sorbate 102 and a volatile gas 212 at the fifth temperature 208. The condenser 144 of the third circuit 142c is thermally coupled to the second circuit 142b, upstream from the evaporator 146 of the second circuit 142b and downstream from the condenser 144 of the second circuit 142b. As shown, heat 124 is passed from the third circuit 142c to the second circuit 142b at a seventh temperature 402.

Figure 5:
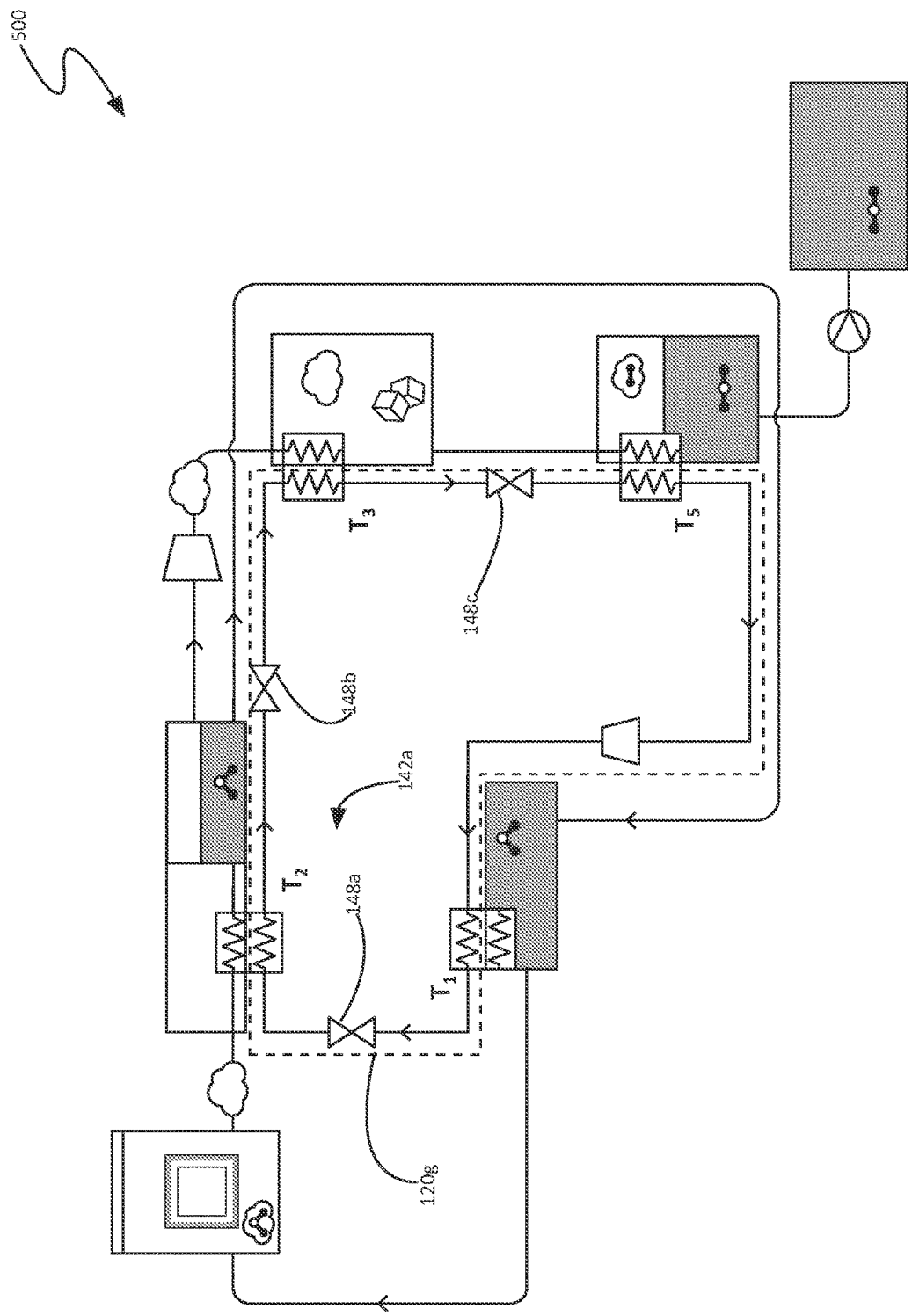
FIG. 5 is a schematic view of another embodiment of a sorbate collection system comprising a single heat pump.

FIG. 5 is a schematic view of a non-limiting example of an embodiment of a system 500 having a single heat pump 120g with a single closed fluidic circuit 142. According to some embodiments, that heat pump 120 may comprise a vapor-compression cycle with multiple levels of pressure reduction so that multiple evaporators 146 can be operated at or near the sequential cooling temperatures. This heat pump 120 (e.g., seventh heat pump 120g of system 500 in FIG. 5, etc.) may include one or more closed fluidic circuits 142 operating at multiple levels of pressure reduction (e.g., heat pump pressure reducers 148a, 148b, and 148c, etc.) giving sequential pressure drops so that multiple evaporators 146 can be operated at or near temperatures corresponding to the sequential cooling temperatures (e.g., second temperature 114, third temperature 202, fifth temperature 208, etc.).

Figure 6:
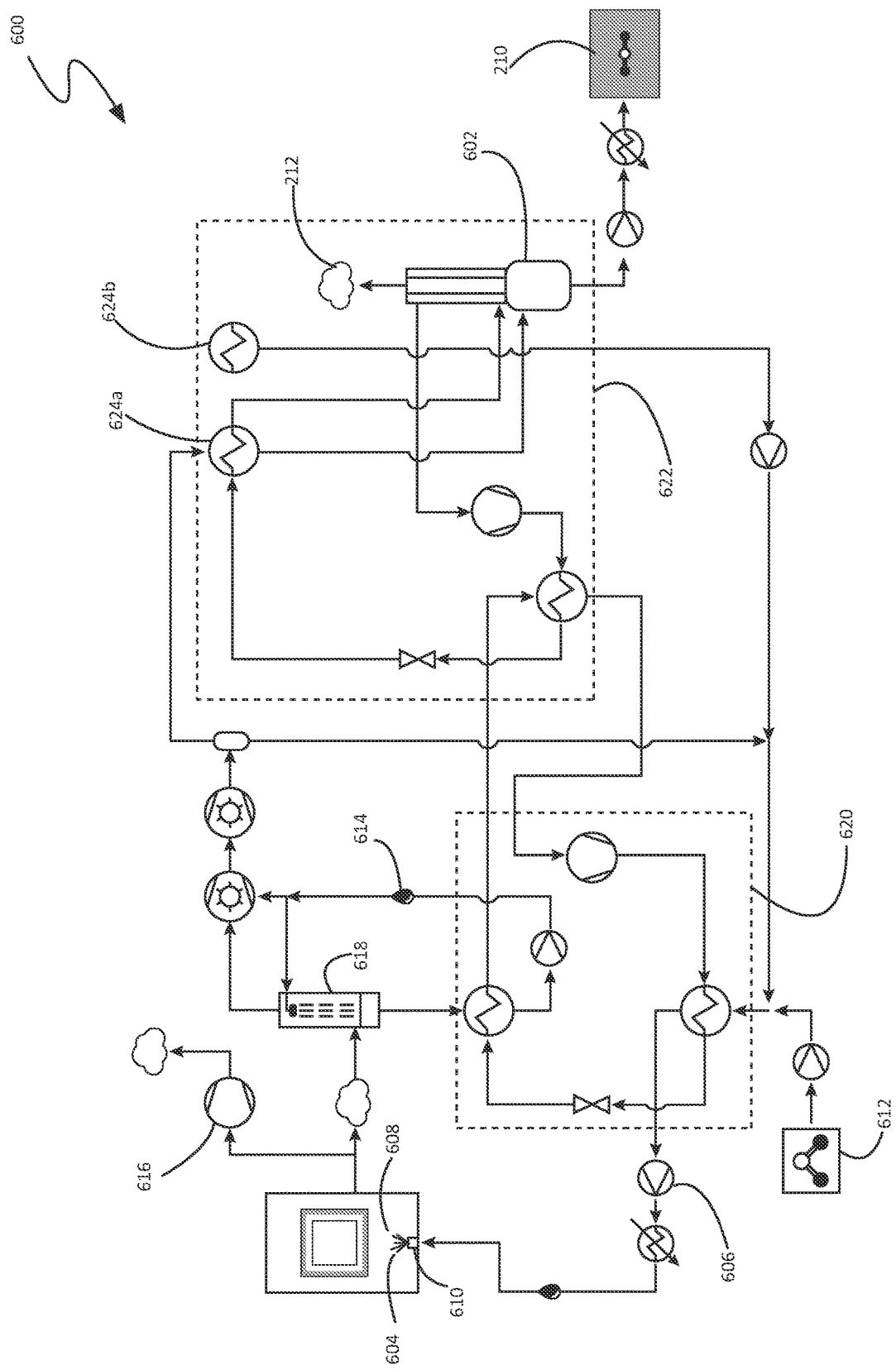
FIG. 6 is a schematic view of an embodiment of a sorbate collection system comprising two heat pumps and a distillation unit.

FIG. 6 is a schematic view of a non-limiting example of another embodiment of an efficient sorbate collection system 600. Like the embodiment shown in FIG. 3, this system 600 employs two heat pumps, which can be thought of as a front-end heat pump 620 that drives the initial removal of water vapor and pressurization, and a back-end heat pump 622, that drives additional purification and compression. According to various embodiments, these two subsystems are designed to match each other in scope, allowing them to function as repeating units and allowing the system 600 to easily scale up in size with a number of units working together to collect sorbate from an even larger number of regeneration vessels 108 and sorbent structures 104.

Many of the features of this system 600 have been discussed at length in the context of other embodiments of the contemplated system and method. However, there are a number of differences. As shown, the system 600 comprises a second compressor 616. Unlike the embodiments previously discussed, this compressor 616 is upstream from the condenser 618.

Initially, the void space within the closed regeneration vessel 108 is filled with air in sufficient quantity to substantially contaminate the sorbate product. According to some embodiments, the evacuation of the vessel 108 is facilitated through the use of a dedicated vacuum system such as this compressor 616, which not only removes the atmospheric contaminants before the introduction of water vapor, it also can create the initial vacuum within the vessel 108. This may be advantageous in embodiments where the system 600 has scaled up and the use of various resources within the system 600 must be coordinated.

Another difference is the method of delivering the heated water to the sorbent material 106 within the vessel 108. Water vapor 116 is energetically much more expensive than liquid water 136, however the mass of the liquid water deployed within the vessel 108 has an impact on the overall efficiency of the system (e.g., wasted heat, wasted energy in moving so much heavy water, etc.). According to various embodiments, the system 600 delivers the heated water to the sorbent material 106 as hot, liquid water being forced out of one or more nozzles 610 by expanding water vapor.

Hot, pressurized liquid water is let down in pressure through a nozzle into the regeneration vessel 108. As it drops below its saturation pressure, some liquid vaporizes and rapidly expands. Although the vapor/liquid water mixture is still mostly liquid on a mass basis, it is predominantly vapor on a volume basis. Its desirable for the rapid expansion to produce a hot mist 614, with droplets 608 of liquid water carried by the vapor into and through the facets of the sorbent structure 104. The vapor/liquid ratio may be controlled to a degree by the feed temperature and pressure. As an option, some embodiments may also deploy supplemental water vapor. In some embodiments, a second liquid pump 606 in fluid communication with the liquid water supply may pressurize the heated liquid water delivered to the nozzle(s) 610 inside the regeneration vessel 108.

According to various embodiments, the system 600 may comprise a direct condenser 618, that extracts heat and condenses the water vapor through direct contact with refrigerated water 614, rather than indirect heat exchange seen in some of the other embodiments discussed. The use of refrigerated water 614 may also be extended to one or more compressors 126. In some embodiments, the post-condenser vapor mixture 132 may be compressed by one or more liquid ring compressors, which form an internal seal using water, in this case, a portion of the refrigerated water 614. This provides direct cooling, further enhanced with the use of refrigerated water. In other embodiments, other types of vacuum compressors may be used.

The water that has been removed is subsequently heated and recycled back to the liquid water supply 110, along with make-up water 612 to compensate for the unavoidable loss of some water during operation of the system 600. As an option, a heat pump cycle may be used to simultaneously produce both refrigeration for condensation and heat for reheating, according to some embodiments.

Like many other embodiments, part of the purification process of this system 600 includes separating sorbate and volatile gases from water vapor through water phase changes. First, water vapor is condensed into liquid while the remainder stays a gas. Next, the residual water vapor is frozen into solid water and separated. Ultimately, the sorbate gas is liquified and pressurized for later use.

The water freeze-out is a batch step operating on a switching cycle. It is desirable to recover water for reuse by melting the ice formed in this step. According to various embodiments, the system 600 may make use of two or more switching heat exchangers 624a and 624b, which may operate between 0° C. and −50° C. When one exchanger (e.g., exchanger 624a) is in use, separating the refined gas from the ice, the frozen residual water builds up over time. Once the ice has reached a predefined level, or after a time has elapsed, or based upon some other metric, the exchangers switch places. The other exchanger 624b is put into use, becoming the recipient of subsequent first sorbate product gas 140 from the front-end subsystem. The first exchanger 624a, now loaded with ice, is reconfigured for water removal. For example, using the heat from a heat pump 120 and/or ambient heat and/or an external heat source, the frozen water is melted and the resulting liquid water is sent with the rest of the recovered water. According to various embodiments, the two or more exchangers continue to switch roles, each working to improve the efficiency and effectiveness of the system 600.

As shown, in some embodiments, the system 600 may make use of a distillation unit 602 to provide multiple condensation steps, delivering better separation of the sorbate 102 (e.g., carbon dioxide) and volatile atmospheric gases. Exemplary distillation units include, but are not limited to, a dephlegmator, or falling film condenser. Such a distillation unit 602 may be a simple equipment component to perform distillation. It should be noted that this distillation must be performed above 520 kPa, to avoid carbon dioxide solid formation in cases where the sorbate 102 is carbon dioxide 103.

In some embodiments, the distillation unit 602 may include a rectification section to reduce the concentration of carbon dioxide 103 in a distillate vapor, and/or a stripping section to reduce the concentration of higher volatility components in the bottom liquid. According to various embodiments, the distillation unit 602 is in thermal contact with the second heat pump (i.e., the back-end heat pump).

The high-purity, liquid carbon dioxide from the distillation unit 602 may then be pumped to high pressure with one or more dense fluid pumps. In this manner, carbon dioxide can be delivered at supercritical pressure which is preferred in pipeline transfer for geological sequestration or enhanced oil recovery.

Where the above examples, embodiments and implementations reference examples, it should be understood by those of ordinary skill in the art that other systems and methods for the efficient capture of a sorbate gas could be intermixed or substituted with those provided. In places where the description above refers to particular embodiments of systems and methods for the efficient capture of a sorbate gas, it should be readily apparent that a number of modifications may be made without departing from the spirit thereof and that these embodiments and implementations may be applied to other gas collection technologies as well. Accordingly, the disclosed subject matter is intended to embrace all such alterations, modifications and variations that fall within the spirit and scope of the disclosure and the knowledge of one of ordinary skill in the art.

What is claimed is:

1. A system for collecting a sorbate gas from a sorbent material, comprising:
    a regeneration vessel configured to enclose a sorbent structure comprising the sorbent material into which the sorbate gas has been sorbed;
    a liquid water supply communicatively coupled to the regeneration vessel and heated to a first temperature to produce a water vapor;
    at least one heat pump;
    a condenser communicatively coupled to the regeneration vessel and also communicatively coupled to the liquid water supply through a liquid pump, the condenser in thermal contact with a first heat pump of the at least one heat pump, wherein the heat pump is also in thermal contact with the liquid water supply such that heat is removed from the condenser at a second temperature lower than the first temperature and provided to the liquid water supply at the first temperature by the first heat pump; and
    a first compressor communicatively coupled to the condenser;
    wherein the sorbent structure within the regeneration vessel is placed in fluidic contact with the water vapor from the liquid water supply at the first temperature after the regeneration vessel has been evacuated to a total pressure below the pressure corresponding to the saturated vapor pressure of water at the first temperature, the water vapor coming into contact with the sorbent material, causing a portion of the sorbate gas to be released and form a vapor mixture comprising the sorbate gas and the water vapor, raising the total pressure to greater than the triple point pressure of the sorbate;
    wherein the vapor mixture is removed from the regeneration vessel and cooled by the condenser, where a portion of the water vapor within the vapor mixture is condensed into liquid water that is returned to the liquid water supply by the liquid pump; and
    wherein a remainder of the vapor mixture is compressed by the first compressor into a first sorbate product gas.

2. The system of claim 1:
    wherein the first sorbate product gas is in thermal contact with a second heat pump of the at least one heat pump,
    wherein the second heat pump extracts heat from the first sorbate product gas at a third temperature that is less than the second temperature and also less than the melting point of water, resulting in a second sorbate product gas and solid water at the third temperature.

3. The system of claim 2:
    wherein the second sorbate product gas is in thermal contact with a third heat pump of the at least one heat pump,
    wherein the third heat pump extracts heat from the second sorbate product gas at a fifth temperature that is less than the third temperature and also less than the boiling point of the sorbate, resulting in a liquified sorbate and a volatile gas at the fifth temperature.

4. The system of claim 2, wherein the first heat pump and the second heat pump are the same heat pump.

5. The system of claim 3, wherein the first heat pump, the second heat pump, and the third heat pump are all the same heat pump.

6. The system of claim 1, wherein the regeneration vessel comprises an opening through which the sorbent structure is physically moved when transitioning between capturing sorbate and releasing sorbate for collection.

7. The system of claim 1:
    wherein each heat pump of the at least one heat pump comprises:
        at least one closed fluidic circuit,
        at least one heat pump condenser,
        at least one heat pump evaporator, at least one heat pump pressure reducer,
at least one refrigerant, and
at least one heat pump compressor,
wherein each closed fluidic circuit comprises one of the at least one heat pump condensers, one of the at least one heat pump evaporators, one of the at least one refrigerants, one of the at least one heat pump pressure reducers, and one of the at least one heat pump compressors.

8. The system of claim 1, wherein the sorbent material is a solid.

9. A method for collecting a sorbate gas from a sorbent material, comprising:
containing a sorbent structure inside a regeneration vessel, the sorbent structure comprising the sorbent material into which the sorbate gas has been sorbed;
producing a water vapor by providing heat at a first temperature to a liquid water supply;
reducing the total pressure of the regeneration vessel to below the pressure corresponding to the saturated vapor pressure of water at the first temperature;
introducing the water vapor at the first temperature to the regeneration vessel, placing the water vapor in fluidic contact with the sorbent material and causing a portion of the sorbate gas to be released and form a vapor mixture comprising the sorbate gas and the water vapor, raising the total pressure within the regeneration vessel to greater than the triple point pressure of the sorbate;
allowing the vapor mixture to leave the regeneration vessel by placing the vapor mixture in fluidic contact with a condenser that is communicatively coupled to the regeneration vessel and also communicatively coupled to the liquid water supply through a liquid pump, the condenser in thermal contact with a first heat pump that is also in thermal contact with the liquid water supply, the first heat pump being one of at least one heat pumps;
removing heat from the vapor mixture at a second temperature that is lower than the first temperature using the first heat pump, causing a portion of the water vapor in the vapor mixture to condense into liquid water;
providing the heat removed from the vapor mixture at the second temperature to the liquid water supply at the first temperature;
returning the liquid water condensed from the vapor mixture to the liquid water supply using the liquid pump; and
compressing a remainder of the vapor mixture with a first compressor communicatively coupled to the condenser, forming a first sorbate product gas.

10. The method of claim 9, further comprising:
extracting heat from the first sorbate product gas at a third temperature with a second heat pump that is in thermal contact with the first sorbate product gas, resulting in a second sorbate product gas and solid water at the third temperature;
wherein the third temperature is less than the second temperature and also less than the melting point of water.

11. The method of claim 10, further comprising:
providing the heat extracted by the second heat pump of the at least one heat pump to one of the liquid water supply at the first temperature and the first heat pump at a fourth temperature that is between the second temperature and the first temperature.

12. The method of claim 10:
extracting heat from the second sorbate product gas at a fifth temperature with a third heat pump that is in thermal contact with the second sorbate product gas, resulting in a liquified sorbate and a volatile gas at the fifth temperature;
wherein the fifth temperature is less than the third temperature and also less than the boiling point of the sorbate.

13. The method of claim 9, wherein the first temperature is between 40° C. and 120° C.

14. The method of claim 9, wherein the second temperature is between 0° C. and 40° C.

15. The method of claim 10, wherein the third temperature is between 0° C. and −56° C.

16. The method of claim 10, further comprising:
melting at least a portion of the solid water and adding said water to the liquid water supply.

17. The method of claim 9, further comprising:
heating the liquid water condensed from the vapor mixture to a sixth temperature near or below ambient temperature using ambient heat, before returning the liquid water to the liquid water supply.

18. The method of claim 9, further comprising:
intermittently closing a fluidic connection between the liquid water supply at the first temperature and the regeneration vessel, causing the released sorbate gas to increase the total pressure of the regeneration vessel to above the saturated vapor pressure of water vapor at the first temperature.

19. The method of claim 9, wherein producing the water vapor comprises passing heated liquid water from the liquid water supply through at least one nozzle, the nozzle being inside the regeneration vessel and communicatively coupled to the liquid water supply, wherein a portion of the heated liquid water expands into the water vapor creating a hot mist comprising the water vapor and water droplets, within the regeneration vessel.

20. The method of claim 10, further comprising:
intermittently placing the second heat pump and a fourth heat pump in fluidic contact with the first sorbate product gas such that when one of the fourth heat pump and the second heat pump is in fluid contact with the first sorbate product gas the other of the fourth heat pump and the second heat pump is isolated from the first sorbate product gas;
extracting heat from the first sorbate product gas at the third temperature with the fourth heat pump resulting in the second sorbate product gas and solid water at the third temperature;
melting at least a portion of the solid water in thermal contact with one of the fourth heat pump and the second heat pump while the other of the fourth heat pump and the second heat pump is in fluid contact with the first sorbate product gas; and
transferring the liquid water from the portion of the solid water that was melted to the liquid water supply.

* * * * *